(12) United States Patent
Zhu et al.

(10) Patent No.: US 10,585,194 B1
(45) Date of Patent: Mar. 10, 2020

(54) SWITCHABLE DIFFUSER PROJECTION SYSTEMS AND METHODS

(71) Applicant: Shenzhen Guangjian Technology Co., Ltd., Shenzhen, Guangdong (CN)

(72) Inventors: Li Zhu, Shenzhen (CN); Fanglu Lyu, Shenzhen (CN); Bo Wang, Shenzhen (CN)

(73) Assignee: Shenzhen Guangjian Technology Co., Ltd., Shenzhen (CN)

( * ) Notice: Subject to any disclaimer, the term of this patent is extended or adjusted under 35 U.S.C. 154(b) by 0 days.

(21) Appl. No.: 16/379,489

(22) Filed: Apr. 9, 2019

Related U.S. Application Data

(63) Continuation-in-part of application No. 16/378,965, filed on Apr. 9, 2019, which is a continuation-in-part of application No. 16/268,493, filed on Feb. 5, 2019, which is a continuation-in-part of application No. 16/259,812, filed on Jan. 28, 2019.

(30) Foreign Application Priority Data

| Jan. 15, 2019 | (CN) | 2019 1 0035662 |
| Jan. 25, 2019 | (CN) | 2019 1 0073808 |
| Mar. 21, 2019 | (CN) | 2019 1 0215970 |
| Mar. 21, 2019 | (CN) | 2019 1 0215976 |

(51) Int. Cl.
*G01S 17/00* (2006.01)
*G01S 17/89* (2020.01)
*G02B 27/30* (2006.01)
*G02B 5/02* (2006.01)

(52) U.S. Cl.
CPC ............ *G01S 17/89* (2013.01); *G02B 5/0205* (2013.01); *G02B 27/30* (2013.01)

(58) Field of Classification Search
USPC ....................................... 356/5.01
See application file for complete search history.

(56) References Cited

U.S. PATENT DOCUMENTS

| 4,329,876 A | 5/1982 | Chen et al. |
| 5,138,687 A | 8/1992 | Horie et al. |

(Continued)

FOREIGN PATENT DOCUMENTS

WO   2016160048 A1   10/2016

OTHER PUBLICATIONS

BenQ Materials to Unveil the Innovative PNLC Film at SID 2018, May 20, 2018; retrieved on Apr. 29, 2019, at http://www.benqmaterials.com/en-ww/news/detail.php?SID=52 (1 page).

(Continued)

*Primary Examiner* — James R Hulka
(74) *Attorney, Agent, or Firm* — Sheppard Mullin Richter & Hampton LLP

(57) ABSTRACT

A system including: a light source, a switchable diffuser, a structured light detector, and a ToF detector. The light source and switchable diffuser are controlled to operate in concert (together, and/or with other optical and electrical elements of the system) to project pulses of collimated beams of light (interleaved between pulses of flood light) during a single image capture period, the pulses of collimated beams of light being resolvable by the structured light detector and the ToF detector within the same image capture period.

23 Claims, 8 Drawing Sheets

(56) References Cited

U.S. PATENT DOCUMENTS

| | | | |
|---|---|---|---|
| 5,511,142 A | | 4/1996 | Horie et al. |
| 5,991,073 A | * | 11/1999 | Woodgate ............ G02B 27/225 |
| | | | 359/462 |
| 8,042,949 B2 | * | 10/2011 | Taylor ................... G06F 3/0421 |
| | | | 345/173 |
| 8,272,743 B2 | * | 9/2012 | Taylor ................... G06F 3/0421 |
| | | | 345/173 |
| 8,300,304 B2 | * | 10/2012 | Gally .................... G02B 6/0041 |
| | | | 359/315 |
| 8,384,997 B2 | | 2/2013 | Shpunt et al. |
| 8,408,775 B1 | * | 4/2013 | Coleman .................... F21V 7/04 |
| | | | 362/602 |
| 8,477,819 B2 | | 7/2013 | Kitamura |
| 8,749,796 B2 | | 6/2014 | Pesach et al. |
| 8,872,085 B2 | * | 10/2014 | Gruhlke ................ G02B 6/0051 |
| | | | 250/208.1 |
| 9,036,158 B2 | | 5/2015 | Pesach |
| 9,097,826 B2 | | 8/2015 | Vasylyev |
| 9,318,877 B2 | * | 4/2016 | Herschbach .......... G01S 17/023 |
| 9,459,461 B2 | | 10/2016 | Santori et al. |
| 9,535,537 B2 | * | 1/2017 | Large ................... G06F 3/0425 |
| 9,575,352 B2 | * | 2/2017 | Weber ................... G02F 1/1334 |
| 10,254,542 B2 | | 4/2019 | Kollin et al. |
| 10,310,261 B2 | * | 6/2019 | Christmas .......... G02B 27/2278 |
| 10,345,506 B1 | | 7/2019 | Lyu |
| 2002/0028045 A1 | | 3/2002 | Yoshimura et al. |
| 2002/0097962 A1 | | 7/2002 | Yoshimura et al. |
| 2005/0201657 A1 | | 9/2005 | Tiefenthaler |
| 2006/0062509 A1 | | 3/2006 | Krol et al. |
| 2008/0297809 A1 | | 12/2008 | Holzapfel et al. |
| 2009/0201571 A1 | * | 8/2009 | Gally .................... G02B 6/0041 |
| | | | 359/315 |
| 2009/0219253 A1 | * | 9/2009 | Izadi ..................... G06F 3/0421 |
| | | | 345/173 |
| 2009/0225244 A1 | * | 9/2009 | Wang ................. G02B 27/2214 |
| | | | 349/15 |
| 2009/0276734 A1 | * | 11/2009 | Taylor ................... G06F 3/0421 |
| | | | 715/863 |
| 2010/0284082 A1 | | 11/2010 | Shpunt et al. |
| 2011/0134955 A1 | | 6/2011 | Kitamura |
| 2011/0170108 A1 | | 7/2011 | Degertekin |
| 2012/0038891 A1 | * | 2/2012 | Taylor ................... G06F 3/0421 |
| | | | 353/28 |
| 2012/0038986 A1 | | 2/2012 | Pesach |
| 2012/0127128 A1 | * | 5/2012 | Large ................... G06F 3/0425 |
| | | | 345/175 |
| 2013/0038881 A1 | | 2/2013 | Pesach et al. |
| 2013/0082905 A1 | * | 4/2013 | Ranieri ............... G02B 27/2214 |
| | | | 345/32 |
| 2014/0049983 A1 | | 2/2014 | Nichol et al. |
| 2014/0300960 A1 | | 10/2014 | Santori et al. |
| 2015/0029211 A1 | * | 1/2015 | Weber ................... G02F 1/1334 |
| | | | 345/592 |
| 2015/0092258 A1 | * | 4/2015 | Herschbach .......... G01S 17/023 |
| | | | 359/238 |
| 2015/0271476 A1 | | 9/2015 | Wan et al. |
| 2016/0209648 A1 | | 7/2016 | Haddick et al. |
| 2017/0082855 A1 | * | 3/2017 | Christmas .......... G02B 27/2278 |
| 2018/0024289 A1 | | 1/2018 | Fattal |
| 2018/0067251 A1 | | 3/2018 | Baldwin et al. |
| 2018/0120563 A1 | | 5/2018 | Kollin et al. |
| 2018/0156963 A1 | | 6/2018 | Fattal |
| 2018/0172893 A1 | | 6/2018 | Fattal et al. |
| 2018/0196194 A1 | | 7/2018 | Fattal |
| 2019/0018137 A1 | | 1/2019 | Akkaya et al. |
| 2019/0137333 A1 | | 5/2019 | Lim et al. |

OTHER PUBLICATIONS

PDLC Film, An integral component of Switchable Privacy Glass, Polymer Dispersed Liquid Crystal (PDLC Film), 2019; retrieved Apr. 29, 2019, at https://www.switchglass.com/au/pdlc-film/ (3 pages).

Fanglu Lu et al., "Planar high-numerical-aperture low-loss focusing reflectors and lenses using subwavelength high contrast gratings", Optics Express, vol. 18, No. 12, Jun. 7, 2010, pp. 12606-12614.

Li Zhu et al., "Flexible photonic metastructures for tunable coloration", Optica, vol. 2, No. 3, Mar. 2015, pp. 255-258.

Final Office Action dated Sep. 27, 2019, issued in U.S. Appl. No. 16/036,814 (25 pages).

Notice of Allowance dated Sep. 27, 2019, issued in U.S. Appl. No. 16/259,812 (6 pages).

Notice of Allowance dated Oct. 30, 2019, issued in U.S. Appl. No. 16/378,965 (5 pages).

Notice of Allowance dated Oct. 30, 2019, issued in U.S. Appl. No. 16/379,489 (8 pages).

Non-Final Office Action dated Oct. 30, 2019, issued in U.S. Appl. No. 16/573,510 (9 pages).

Notice of Allowance dated Dec. 19, 2019, issued in U.S. Appl. No. 16/036,814 (15 pages).

* cited by examiner

SWITCHABLE DIFFUSER PROJECTION SYSTEMS AND METHODS

CROSS REFERENCE TO RELATED APPLICATIONS

The present application is a continuation-in-part of U.S. patent application Ser. No. 16/378,965, filed on Apr. 9, 2019 (which is based upon and claims priority to Chinese Patent Application Nos. 201910215970.6 and 201910215976.3, each filed on Mar. 21, 2019), which is a continuation-in-part of U.S. patent application Ser. No. 16/268,493 filed on Feb. 5, 2019 (which is based upon and claims priority to Chinese Patent Application No. 201910073808.5, filed on Jan. 25, 2019), which is a continuation-in-part of U.S. patent application Ser. No. 16/259,812 filed on Jan. 28, 2019 (which is further based upon and claims priority to Chinese Patent Application No. 201910035662.5, filed on Jan. 15, 2019). The present application also claims priority to Chinese Patent Application No. 201910215970.6, filed on Mar. 21, 2019, Chinese Patent Application No. 201910215976.3, filed on Mar. 21, 2019, Chinese Patent Application No. 201910073808.5, filed on Jan. 25, 2019, and Chinese Patent Application No. 201910035662.5, filed on Jan. 15, 2019. All of the above-referenced applications are incorporated herein by reference in their entirety.

TECHNICAL FIELD

This disclosure relates to systems and methods projecting light, and selectively controlling the projection of such light using a switchable diffuser arrangement.

BACKGROUND

Light projecting technologies are essential for enabling several important device functionalities. For example, structured light projecting is deployed in 3D camera modules of mobile phones for recognizing facial features. The projected light reflects off the facial features can be captured by a detector and analyzed by algorithms to "perceive" the topology of the face. Accordingly, authentication, emoji generation, image capture orientation, and other various functionalities can be designed based on inputs of the facial feature recognition.

Current light projecting technologies are disadvantaged for high cost, large size, and low integration. In particular, conventional light projecting technologies do not fully utilize already available light sources to achieve the multiple functions sought, and instead utilize multiple projection means to achieve their objectives. These inefficiencies impose bottlenecks for the advancement of device structure and function built on or around the light projection features. Therefore, improvements over the existing light projecting technologies are desirable for both the consumer market and the industry.

Light projection is a key step for various applications such as 3D feature detection and 3D mapping. In conventional systems, multiple light sources and light projection subsystems are deployed in combination with one another to provide 3D feature detection and 3D mapping technology. For instance, many conventional systems mount both a distinct flood light illumination component and a distinct dot projector component to achieve the desired readings. In general, the light produced by the flood light component is broad beam light that spreads substantially as it propagates. Flood light is used to illuminate a surface of interest for image capture. The light produced by dot projector, on the other hand, is narrow beam light configured with substantially parallel rays that do not disperse or diverge with propagation as readily as flood light. Using two distinct light sources to achieve both flood light illumination and dot projection is inefficient and results in cumbersome modules that are ill suited for small environments.

SUMMARY

Various embodiments of the present disclosure include light projecting systems and structures, switchable diffusers and other devices.

According to one aspect, a light projecting system comprises: a light projecting system configured to project a plurality of collimated beams of light; a switchable diffuser having a first surface and a second surface, the switchable diffuser coupled to a control source and configured to change from a first state to a second state responsive to the control source being changed from a first condition to a second condition; wherein in the first state the switchable diffuser is configured to receive at least a portion of the plurality of collimated beams of light at the first surface and project a flood light out of the second surface; wherein in the second state the switchable diffuser is configured to permit at least a portion of the plurality of collimated beams of light to propagate out of the second surface as an array; and a processing engine electrically coupled with a non-transitory computer readable medium having machine readable instructions stored thereon, which, when executed by the processing engine, cause the system to: oscillate the control source between the first condition and the second condition in accordance with a first predetermined pattern. It will be understood that, for purposes of this disclosure, the term "computer readable medium" extends to any medium configured to store machine readable instructions that can be executed by a processing engine. For example, such mediums may be found in a microcontroller unit, as system on a chip, or in any combination of the foregoing.

In some embodiments, the light projecting system comprises a vertical-cavity surface-emitting laser (VCSEL) element, a diffraction optics element, and/or a waveguide.

In some embodiments, the light projecting system comprises a waveguide, the waveguide comprising a surface A and a surface B; the surface A comprises a plurality of grating structures; the waveguide is configured to guide an in-coupled light beam to undergo total internal reflection between the surface A and the surface B; and the grating structures are configured to disrupt the total internal reflection to cause at least a portion of the in-coupled light beam to couple out of the waveguide from the surface A, the portion of the in-coupled light beam coupled out of the waveguide forming out-coupled light beams comprising the plurality of collimated beams of light; the surface A is in an x-y plane comprising an x-direction and a y-direction perpendicular to each other; the in-coupled light beam propagates inside the waveguide substantially along the x-direction of the x-y plane; the out-coupled light beams propagate substantially along a z-direction normal to the x-y plane; the grating structure is each associated with a grating depth, a duty cycle, a period, and an orientation in the x-y plane with respect to the z-direction; the grating structures at different x-direction positions have at least one of different grating depths or different grating duty cycles; the grating structures at different x-direction positions have different periods; and the grating structures at different y-direction positions have different orientations.

In some embodiments, the light projecting system comprises a plurality of diodes.

In some embodiments, the system further comprises: a detector configured to capture light information based on one or more flood light reflections off of an object, and array reflections off of an object, wherein: the machine readable instructions, when executed by the processing engine, cause the system to demultiplex light information received at the detector.

In some embodiments, the switchable diffuser comprises a polymer-liquid crystal mixture having a molecular orientation responsive to an applied voltage.

In some embodiments, the switchable diffuser comprises a meta-stable liquid crystal having a molecular orientation responsive to voltage.

In some embodiments, the switchable diffuser comprises a polymer dispersed liquid crystal.

In some embodiments, the switchable diffuser comprises a polymer network liquid crystal.

In some embodiments, the first predetermined pattern causes the light projecting out of the second surface of the switchable diffuser to comprise alternating bursts of flood light and collimated beams of light achieving a time division multiplexed emission.

In some embodiments, the first voltage condition is an applied voltage of 0V, and the second voltage condition is an applied voltage of between 1 V and 50 V or more.

In some embodiments, the first voltage condition is achieved upon application of a voltage of between 75-85V for a first period of time, and the second voltage condition is achieved upon application of a voltage of between 55-65V.

In some embodiments, the first predetermined pattern comprises switching between the first voltage condition and the second voltage condition two or more times during image capture period to achieve a predetermined ratio of flood light projection to collimated light projection.

In some embodiments, the predetermined oscillation pattern is configured to achieve a predetermined projection ratio of flood light to collimated light.

In some embodiments, the predetermined oscillation pattern is configured to achieve a predetermined projection ratio of flood light to collimated light, and the projection ratio is 1:1.

In some embodiments, the predetermined oscillation pattern is configured to achieve a predetermined projection ratio of flood light to collimated light, and the projection ratio is 10:1.

In some embodiments, the predetermined oscillation pattern is configured to achieve a predetermined projection ratio of flood light projection time to collimated light projection time, and the projection ratio is about between 1:1 to 10:1.

In some embodiments, the non-transitory computer readable medium is further configured with machine readable instructions stored thereon, which, when executed by the processing engine, cause the system to: oscillate the control source between the first condition and the second condition in accordance with a second predetermined pattern; and the second predetermined pattern comprises switching between the first voltage condition and the second voltage condition two or more times during a second image capture period to achieve a second predetermined ratio of flood light projection to collimated light projection, and further wherein the second predetermined ratio is different than the first predetermined ratio.

In some embodiments, the non-transitory computer readable medium is further configured with machine readable instructions stored thereon, which, when executed by the processing engine, cause the system to: adjust the time period of one or more of the first image capture period and the second image capture period based on one or more of a detected ambient lighting condition and a transaction security condition.

According to another aspect, a light projecting method comprises: projecting a plurality of collimated beams of light; providing a switchable diffuser having a first surface and a second surface, the switchable diffuser coupled to a control source and configured to change from a first state to a second state responsive to the control source being changed from a first condition to a second condition; wherein in the first state the switchable diffuser is configured to receive at least a portion of the plurality of collimated beams of light at the first surface, and project a flood light out of the second surface; wherein in the second state the switchable diffuser is configured to permit at least a portion of collimated beams of light to propagate out of the second surface as an array; oscillating the control source between the first condition and the second condition in accordance with a first predetermined pattern.

In some embodiments, projecting the plurality of collimated beams of light comprises projecting the plurality of collimated beams of light from a waveguide, the waveguide comprising a surface A and a surface B; the surface A comprises a plurality of grating structures; the waveguide is configured to guide an in-coupled light beam to undergo total internal reflection between the surface A and the surface B; and the grating structures are configured to disrupt the total internal reflection to cause at least a portion of the in-coupled light beam to couple out of the waveguide from the surface A, the portion of the in-coupled light beam coupled out of the waveguide forming out-coupled light beams comprising the plurality of collimated beams of light.

According to another aspect, a system in accordance with the present disclosure includes: a light source configured to generate light (e.g., IR light); a projecting structure configured to receive the generated light and responsively project a plurality of collimated beams of light (collectively referred to herein as a light projecting structure); and a switchable diffuser having a first surface and a second surface. In some embodiments, the switchable diffuser is coupled to a control source such as a voltage source. Though other control sources may be implemented with the present technology (e.g., current sources, etc.), the present disclosure regularly refers to a voltage sources by way of example only, and are not intended to be limiting. The switchable diffuser is configured to change from a first state to a second state responsive to the voltage source being changed from a first voltage condition (e.g., 0V) to a second voltage condition (e.g., 1-50V). When the switchable diffuser is in the first state, the switchable diffuser is configured to receive the plurality of columnated beams of light at the first surface, diffuse the plurality of collimated beams of light and project a flood light out of the second surface. When the switchable diffuser is in the second state, the switchable diffuser is configured to be substantially transparent to the plurality of collimated beams of light incident upon it, and to permit the plurality of collimated beams of light to propagate out of the second surface as an array (e.g., a dot array). Example systems may also include a detector configured to capture light information based on one or more flood light reflections off of an object, and dot array reflections off of an object. In some embodiments, the system is configured to demultiplex light information received at the detector.

In some embodiments, an example system of the present disclosure is provided with a controller to manipulate and regulate operations of elements of the system. The controller may include a processing engine electrically coupled with a non-transitory computer readable medium having machine readable instructions stored thereon, which, when executed by the processing engine, cause the system to perform various operations. For example, in some instances the instructions, when executed, cause the system to oscillate the voltage source between the first voltage condition and the second voltage condition in accordance with a predetermined oscillation pattern. In some embodiments, the predetermined oscillation pattern causes the light projecting out of the second surface of the switchable diffuser to comprise alternating bursts of flood light and collimated beams of light achieving a time division multiplexed emission. In some embodiments, the predetermined oscillation pattern comprises switching between the first voltage condition and the second voltage condition two or more times during image capture period to achieve a predetermined ratio of flood light projection to collimated light projection (e.g., from anywhere between 1:1-10:1, 1:1-100:1, 1:10-1:1, or 1:100-1:1, etc.).

In some embodiments, the systems of the present disclosure may include a module equipped with both a structured light detector (i.e., a non-ToF detector, e.g., an IR dot array detector) as well as a Time-of-Flight ("ToF") detector. Both of the structured light detector and the ToF detector may be configured to receive light reflections from the light pulses projected from light projection system, but each may capture, transduce, filter, and/or assess the light differently (or produce signals that may be filtered and/or assessed differently) to derive feature, structure and/or depth information about objects upon which the light projected from light projecting system is incident.

In some embodiments, a light projecting subsystem of a system including both a structured light detector and a ToF detector may nevertheless include a single light source and single switchable diffuser. Such light source and switchable diffuser may operate in accordance with one or more features of such elements as discussed herein. In some embodiments, systems of the present disclosure may include a controller coupled with the structured light detector and the ToF detector, and configured to operate only one of the structured light detector and the ToF detector during a given image capture period—e.g., in "ToF mode" or "non-ToF mode" (ToF mode referring to the situation where only a ToF detector is operating during a given image capture period, and "non-ToF mode" referring to the situation where only a structured light detector is operating during a given image capture period. In other embodiments, such a controller may be configured to operate both the structured light detector and the ToF detector together during a given image capture period—e.g., in "hybrid mode" (hybrid mode referring to the case where controller synchronizes operations of the structured light detector and the ToF detector (along with the operation of other elements of the system, e.g., the timing of the switchable diffuser's change of state, the timing of the light sources emissions within the light projecting subsystem of the system, etc.) such that both detectors may coherently operate during a given image capture period.

In some embodiments employing ToF detectors, controller may switch between modes—e.g., switch between operation of the system in ToF mode, non-ToF mode, or hybrid mode—based on input from a user (e.g., user selection), or based upon one or more detected condition(s) (e.g., lighting conditions, component status detection, etc.).

In some embodiments, the technology of the present disclosure may include a system, comprising: an IR detector configured to capture light information based on one or more flood light reflections off of an object, and structured light array reflections off of an object; a Time-of-Flight (ToF) detector configured to measure time differences between the returning light reflections off of a surface of the object (or off of multiple surfaces of different objects), and to enable the determination of one or more depth measures associated with different portions of such surface(s) based on the time differences between different portions of returning light reflections; and a switchable diffuser having a first surface and a second surface, the switchable diffuser coupled to a control source and configured to change from a first state to a second state responsive to the control source being changed from a first condition to a second condition. In some such embodiments the first state the switchable diffuser may be configured to receive at least a portion of the plurality of collimated beams of light at the first surface and project a flood light out of the second surface. In second state the switchable diffuser may be configured to permit at least a portion of the plurality of collimated beams of light to propagate out of the second surface as an array. In some embodiments, the light projecting system includes a processing engine electrically coupled with a non-transitory computer readable medium having machine readable instructions stored thereon, which, when executed by the processing engine, cause the system to: oscillate the control source between the first condition and the second condition in accordance with a first predetermined pattern. In some embodiments, oscillating the control source between the first condition and the second condition in accordance with a first predetermined pattern causes a plurality of pulses of collimated light to be projected out of the switchable diffuser during a single image capture period. In some embodiments, the ToF sensor and the structured light sensor are configured to receive reflections of collimated light from one or more of the same pulses of collimated light during a single image capture period.

In some embodiments, the switchable diffuser may be controlled to emit pulses of collimated beams of light that effectuate a modulation of the collimated beams of light that the ToF detector may be configured to resolve. Such modulation may be one or more of pulsed amplitude modulation, pulsed frequency modulation, continuous wave amplitude modulation, and continuous wave frequency modulation.

In some embodiments, the technology provided herein is drawn to methods for performing the functionality described with respect to the example systems hereof.

According to another aspect, a light projecting system comprises: an IR detector configured to capture light information based on one or more flood light reflections off of an object, and array reflections off of an object; a Time-of-Flight (ToF) detector configured to detect differences between particles based on their time of flight; a switchable diffuser having a first surface and a second surface, the switchable diffuser coupled to a control source and configured to change from a first state to a second state responsive to the control source being changed from a first condition to a second condition; wherein in the first state the switchable diffuser is configured to receive at least a portion of the plurality of collimated beams of light at the first surface and project a flood light out of the second surface; wherein in the second state the switchable diffuser is configured to permit at least a portion of the plurality of collimated beams of light to propagate out of the second surface as an array; and a processing engine electrically coupled with a non-transitory computer readable medium having machine readable instructions stored thereon, which, when executed by the processing engine, cause the system to: oscillate the control source between the first condition and the second condition in accordance with a first predetermined pattern; cause the switchable diffuser to emit pulses of collimated beams of light to effectuate a modulation of the collimated beams of light that the ToF detector is configured to resolve.

According to another aspect, a light projecting method comprises: receiving light generated by a light source light and responsively projecting a plurality of collimated beams of light; providing a switchable diffuser having a first surface and a second surface, the switchable diffuser coupled to a voltage source and configured to change from a first state to a second state responsive to the voltage source being changed from a first condition to a second condition; and oscillating the voltage source between the first condition and the second condition in accordance with a first predetermined pattern, the voltage oscillations causing alternating flood light and dot array projections to be emitted from the second surface of the switchable diffuser in a time-division multiplexed manner.

In some embodiments, the method further comprises detecting, at a light sensor, light information from the alternating flood light and dot array light reflections off of an object, wherein the light sensor is synchronized with the voltage oscillations and/or the alternations in flood light and dot array light projection; demultiplexing light information detected at the light sensor; and generating a 3D map of the object based on the demultiplexed light information.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION

The disclosure and figures of each of U.S. application Ser. Nos. 16/036,776, 16/036,801, and 16/036,814 are hereby incorporated by reference into the instant disclosure in their entirety. Similar features and elements within each specification may be substituted or reapplied for one or more elements discussed below, as will be readily apparent to a person of ordinary skill in the art.

Figure 1:
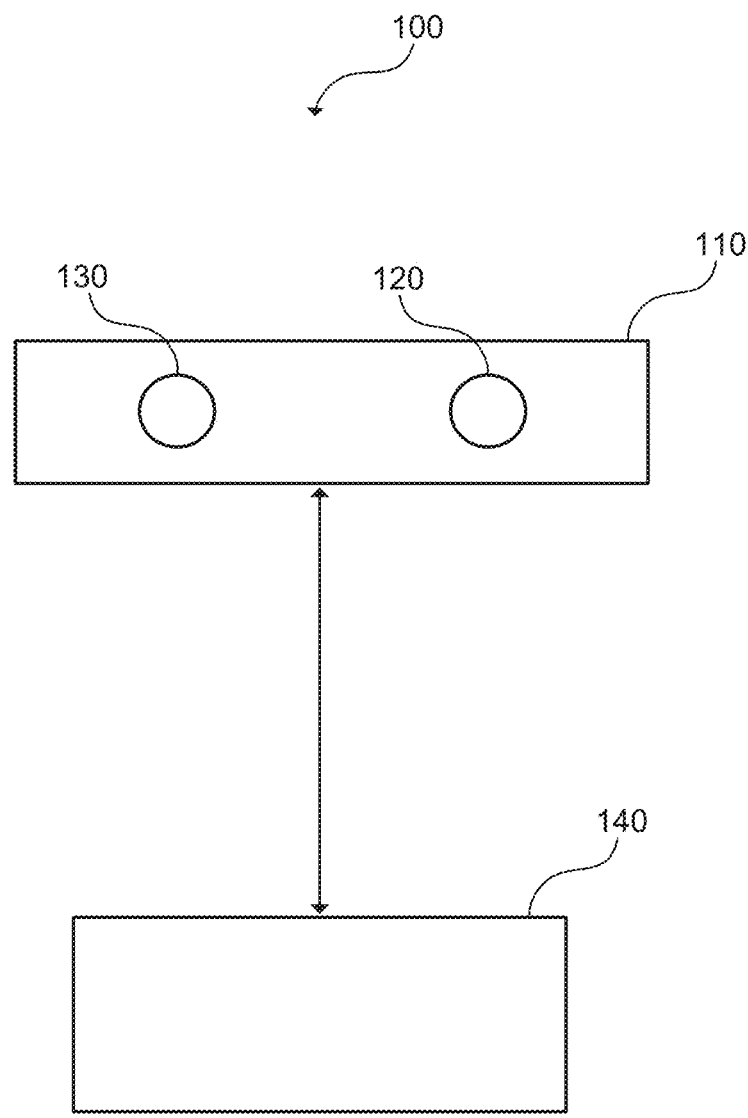
FIG. 1 is a graphical illustration of an example system in accordance with various embodiments of the present disclosure.

FIG. 1 illustrates a diagram depicting an example system for achieving 3D feature detection in accordance with one or more embodiments of the present disclosure. Referring to FIG. 1, a system 100 for achieving 3D feature detection may include a light projecting subsystem 130 and a detector 120 mounted to a module 110 (the module providing structural, optical, and/or electrical support), and a controller 140 in operative communication with module 110 (or one or more elements of module 110). As discussed in more detail herein, light projecting subsystem 130 may be configured to selectively produce both flood light and dot light projections during image capture, avoiding the need to mount and use multiple distinct light projection systems within a given module. System 100 may be implemented in various systems or devices, such as mobile phones, computers, pads, wearable devices, vehicles, etc.

Light projecting subsystem 130 may comprise various elements, including one or more light sources (e.g., a component of a light projecting system 130), shown with more particularity in FIG. 2-5. A light source of such a light projecting subsystem 130 may project structured or columnated light beams of a predetermined or random pattern onto a surface. The structured or columnated light may be coupled into and through one or more other optical and optoelectronic elements of the light projecting subsystem 130, such as a lens and/or switchable diffuser element. In operation, light emitted out of such a switchable diffuser element may be directed toward a surface of an object of interest (e.g., such as a face). Reflections of light off of the surface an object may be captured by one or more detectors 120 (e.g., camera sensors). Light information captured by detectors 120 may be used to determine depth information (in the case of reflected columnated light, based on shifts and distortions relative to a reference) and object feature information (in the case of reflected flood light, based on wavelength/frequency). Various other optically derived parameters may be determined based on the reflected light as captured by the detectors 120. In some embodiments, the detector is configured to receive reflections of out-coupled beams off multiple locations on a distant object to determine distances of the multiple locations relative to the system, or a designated element of the system, or a designated reference point in relation to the system.

As shown, the light projecting subsystem 130 and detector 120 may be mounted to or otherwise coupled with the same modular structure (e.g., module 110). In some embodiments, the light projecting subsystem 130 and detector 120 are mounted to or otherwise coupled with different modules. In each case, however, detector 120 may be positioned to assume an orientation relative to the light projecting subsystem 130 such that reflections of the projecting subsystem's light off of multiple locations on a distant object may be received by the light sensors of the detector elements. The received reflections may be used to determine distances of the multiple locations relative to a predetermined reference point (e.g., the position of the light projecting subsystem 130). In some embodiments, a virtual flat reflective plane at a single position on the surface of the object may be used as a reference, and reflections of the projected light off the reference can be predetermined as reference reflection beams. A surface topology (e.g., facial features in the case of a facial surface) can be determined based on the differences between the detected reflection beams and the reference reflection beams, manifested as shifts or distortions of the reference reflection beams. Such determination method may be known as the triangulation method.

Figure 2:
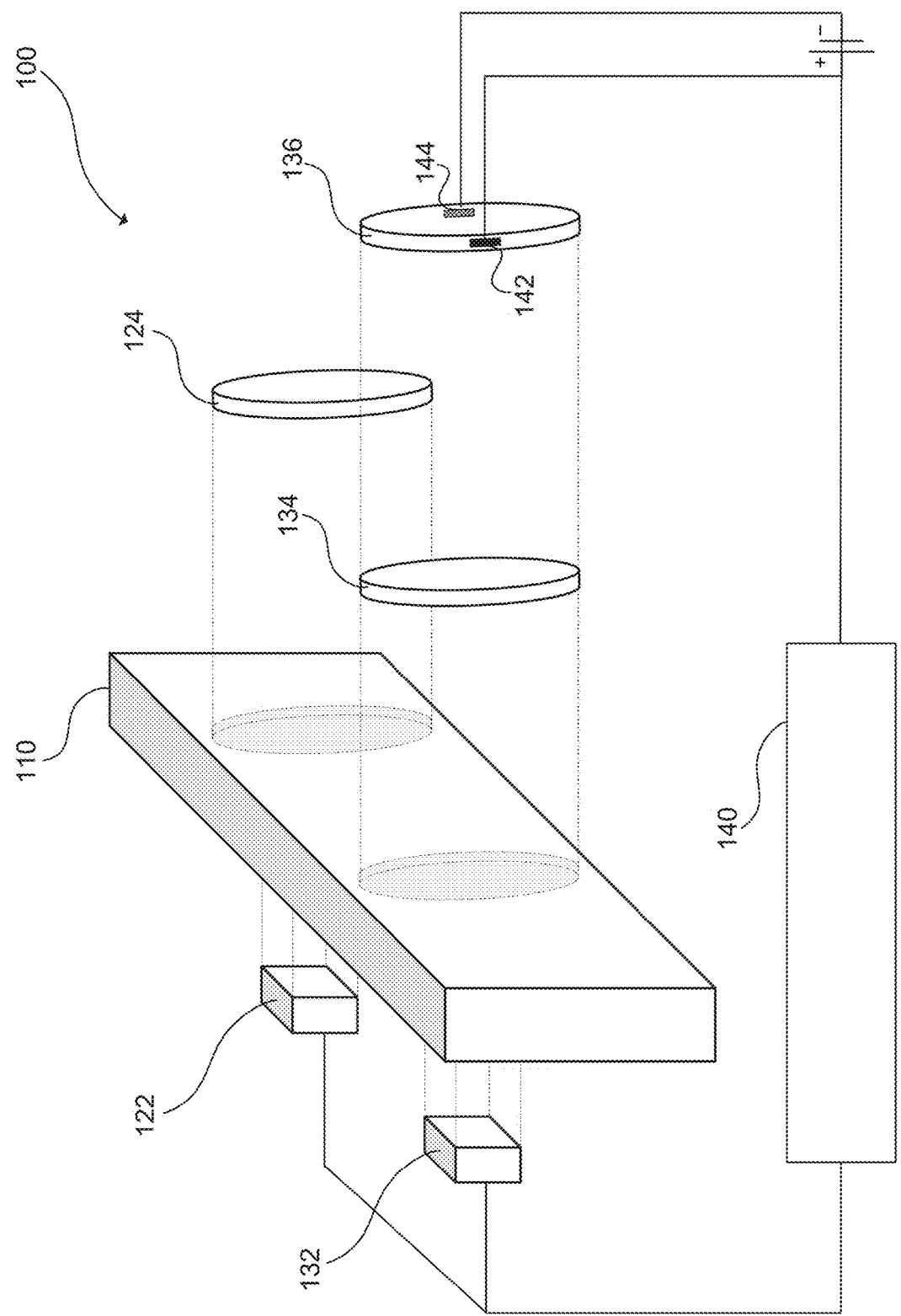
FIG. 2 is a side-view graphical illustration of an exemplary system for projecting flood light and dot light in a time-division multiplexed manner using a single light source and a switchable diffuser in accordance with various embodiments of the present disclosure.

FIG. 2 is a side-view graphical assembly illustration of an example system 100 for projecting both flood light and dot light projections from a light projection subsystem to achieve 3D feature detection in accordance with one or more embodiments of the present disclosure in accordance light in accordance with various embodiments of the present disclosure. Referring to FIG. 2, an example light projecting subsystem 130 (introduced in FIG. 1) may include a light source 132, a light projecting structure 134, and a switchable diffuser 136. An example light projecting structure 134 may be a beam array projecting structure, such that the projected beam array forms an array (e.g. a dot array) on a surface (e.g., a 2D surface, a 3D surface, etc.). In operation, the light from the light source passes through the light projecting structure 134 and the switchable diffuser 136 to reach the object (not shown) of interest for imaging. Detector 120 (introduced in FIG. 1) may include a light sensor 122 configured to receive and process the light reflected off of the object being imaged. Detector 120 may in some instances include one or more other optical or optoelectronic elements to filter, channel or otherwise guide desirable light reflections to light sensor 122. Filter 124 is shown in FIG. 2 is an example of an optical element that may be used in connection with light sensor 122.

Light source 132 may comprise any form of light source. For example, light source 132 may emit infrared (IR) light, or any other visible or nonvisible light within any range of the electromagnetic spectrum. For example, light source 132 may include a single laser (e.g., an edge-emitting laser, a vertical-cavity surface-emitting laser (VCSEL)), a light-emitting diode (LED) with light collimation, or the like. Alternatively, the light source 132 may comprise multiple lasers or diodes (e.g., an edge-emitting laser array, a VCSEL array, a LED array). The light source 132 may include one or more of the light sources disclosed in U.S. application Ser. Nos. 16/036,776, 16/036,801, and 16/036,814, each of which is incorporated herein by reference in its entirety.

Light projecting structure 134 may comprise a waveguide configured to receive light emitted from light source 132, and project a plurality of dot beams. In such embodiments, light from light source 132 may couple into light projecting structure 134 from any surface or portion of a surface, and/or couple out of the light projecting structure 134 from any surface or portion of a surface.

Light projecting system 130 may comprise any one or more of the light projecting devices and light projecting structures disclosed in U.S. application Ser. Nos. 16/036,776, 16/036,801, and 16/036,814, each of which is which is incorporated herein by reference in its entirety. In one nonlimiting example, in some embodiments, the light projecting system 130 may comprise a projection lens structure such as projection lens structure 231 of U.S. application Ser. No. 16/036,801, which may be configured to collimate the light from the light source, and/or to project a random or structured dot array. For example, per working distance requirement of different applications, the laser waist of the projected beam array as collimated by the projection lens structure 231 can vary from 10 mm to 1 meter. Thus, the projection lens structure 231 may collimate the output light to form clear image (e.g., a dot array) at a distance of interest (e.g., in the range of 10 cm to 10 m depending on the application). In another nonlimiting example, any of the grating structures disclosed in U.S. application Ser. No. 16/036,801 may be utilized as, with, or in connection with one or more of the light sources 132, projection lenses, and/or waveguides 134 introduced in the present disclosure. In another nonlimiting example, light projecting subsystem 130 may comprise the system 102 of U.S. application Ser. No. 16/036,801.

In some alternative embodiments, light projecting subsystem 130 may comprise multiple diodes (e.g., lasers such as an edge-emitting laser array or a VCSEL array, diodes such as a LED array), or any other structure that produces a beam array arranged to impinge on at least a portion of the switchable diffuser material. Light projecting subsystem 130 may include one or more of the structures or systems disclosed in U.S. application Ser. Nos. 16/036,776, 16/036, 801, and 16/036,814, each of which is incorporated herein by reference in its entirety.

In some alternative embodiments, light projecting subsystem 130 may comprise a diffraction optical element ("DOE") to generate multiple dots in combination with a VCSEL array. For example, if the VCSEL array comprises 150 dots (e.g., beams of collimated light), the DOE in combination therewith may effectively provide a 10× multiplier to generate 1500 dots at the output plane. In another example, if the VCSEL array comprises 300 dots (e.g., beams of collimated light), the DOE in combination therewith may effectively provide a 100× multiplier to generate 30000 dots at the output plane. Any type of DOE may be employed, including DOEs that generate any multiple of dots as the underlying VCSEL array (e.g., 10×-100×, or greater or less).

In some embodiments, light beams emerging from the light projecting structure 134 may couple out from a surface of the light projecting structure 134. Then, optionally, the light beams may pass through the switchable diffuser 136 to be projected into the space. The switchable diffuser 136 may be configured to receive beams from the light source 132 and project the beams (in the same or modified form) into an environment containing a distant object to be imaged. Alternatively, the light beams may be directly projected from the light source 132 into switchable diffuser 136, and the into the space. In some embodiments where a light projecting structure 134 is utilized (as shown in the figures), the light projecting structure 134 may comprise various lens or lens combinations (e.g., one to six pieces of separate lenses) for controlling directions of the projected beams.

Switchable diffuser 136 may comprise any liquid crystal or polymer based mixture having an adjustable molecular orientation responsive to an applied voltage, including, for example, any prior art mixtures. For example, switchable diffuser 136 may include any polymer-liquid crystal mixture, or any other liquid crystal mixture. In some embodiments, the switchable diffuser 136 may comprise an immiscible mixture of liquid crystal and polymer such as a polymer dispersed liquid crystal (PDLC), or a polymer network liquid crystal (PNLC), or DLP material. Such mixtures combine the electro-optical properties of liquid crystals with structural properties provided by polymers. In other examples, switchable diffuser 136 may comprise a meta-stable liquid crystal (MSLC).

In some embodiments, the switchable diffuser 136 may display optical scattering properties when it is not subjected to a substantial electric field. PDLC type switchable diffusers 136, for instance, may provide such optically scattering properties. In some embodiments of a PDLC type switchable diffuser 136, the concentration of polymer within the liquid crystal may be about between 20% to 60% to achieve scattering. In some embodiments of a PDLC type switchable diffuser 136, the concentration of polymer within the liquid crystal may be about between 60% to 80%. The polymer is cured within the liquid/polymer emulsion such that droplets of liquid crystal separate out within the polymer structure. Liquid crystal molecules within each droplet have localized order, but each droplet may be randomly aligned relative to other droplets in the mixture. In some embodiments of switchable diffuser 136, the combination of small droplet size and isotropic orientation of droplets in the PDLC mixture leads to a highly optically scattering structure in the absence of a substantial electric field.

When a substantial electric field is applied across a PDLC type switchable diffuser 136, however, the orientation of the liquid crystal droplets in the mixture changes, reduces the degree of optical scattering that will occur when light is coupled into the structure and passes out the other side. If a sufficient electrical field is applied across a PDLC type switchable diffuser 136, in accordance with one or more embodiments of the present disclosure, the switchable diffuser 136 structure will achieve a substantially transparent state such that in-coupled light will pass through with little to no scattering.

Similarly, a PNLC type switchable diffuser 136, for example, may also provide optically scattering/diffusion properties. A PNLC type switchable diffuser 136 comprises a network of polymer chains throughout the structure, where concentration of polymer within the within the liquid crystal may be about between 1% to 15%. Like PDLCs, PNLCs may switch between a substantially scattering state and a substantially transparent state under application of appropriate electric fields.

In still further embodiments, an MSLC type switchable diffuser 136 may provide optically scattering/diffusion properties in response to certain conditions, and optically transparent properties in response to other conditions. An MSLC is a type of liquid crystal that may switch between a substantially scattering state and a substantially transparent states upon application of an appropriate electric field. But unlike most PNLCs and PNLCs, MSLCs do not require that the applied electric field be maintained in order to maintain a given state (e.g., a scattering state or a transparent state). Instead, MSLCs may be configured to switch between these two states based on temporary/momentary application of an electric field. For example, a driver may only need to send one AC signal with a duration long enough to make the transition from a substantially scattering state and a substantially transparent state, and vice versa. For instance, some embodiments of the present disclosure may include an MSLC type switchable diffuser 136 configured to switch from the substantially diffuse/scattering state to the substantially transparent state upon application of an AC voltage signal (e.g., of 60V with 1 kHz, 50% duty cycle) that lasts at least long enough to make the transition (i.e., switch) between states. Similarly, to switch from the substantially transparent state to the substantially diffuse/scattering state, another AC voltage signal (e.g., of 80V with 50 kHz, 50% duty cycle) may be applied for a period that is at least long enough to make the transition back. However, once the transition has taken place, no further application of an electric field is needed to maintain either the substantially transparent or substantially diffuse/scattering state. That is, in such embodiments, the voltage signal can be discontinued once the switch between states has occurred; and no additional voltage signal is needed until it is desired to affect a switch back to the other state.

Switchable diffuser 136 may further comprise additional layers in combination with the scattering elements. Such additional layers may provide polarization stability, structural support, and electric conductivity in connection with the PDLC, PNLC, and/or MSLC materials.

Accordingly, switchable diffuser 136 can be controlled to assume one of at least two different states—a diffuser/scattering state and a transparent state—depending on the electric field applied to it. For purposes of the present disclosure, the diffuser/scattering state may also be referred to herein as a "first state" or an "off state," and the transparent state may also be referred to herein as a "second state" or an "on state."

As shown in FIG. 2, system 100 may include a controller 140 that is operatively coupled with one or more of light sensor 122, light source 132 and switchable diffuser 136. Controller 140 may be configured to actuate light source 132, causing light source 132 to project light. Controller 140 may further be configured to process image information received by light sensor 122 during a time in which controller 140 has actuated light source 132. Controller 140 may further be configured to selectively apply an electric field (e.g., a voltage) to the switchable diffuser 136 to achieve switching between an off state (diffusion/scattering state) and an on state (transparent state). Controller 140 may be configured to effectuate synchronized operation of light sensor 122, light source 132, and switchable diffuser 136 to achieve a time division multiplexed propagation of flood light and dot light projections.

In particular, controller 140 may be configured to selectively oscillate (or otherwise change) the application of an electric field across switchable diffuser 136 while light from light source 132 (which optionally will have passed through light projecting structure 134) is being in coupled at a first surface of the switchable diffuser 136 and out coupled through a second surface of switchable diffuser 136. Such selective oscillations (or other selective changes) cause switchable diffuser 136 to switch between and off state and an on state such that during a first period of time the light emitted out of the second surface of switchable diffuser 136 comprises a flood light projection, and that during a second or subsequent period of time the light emitted out of the second surface of switchable diffuser 136 comprises a dot light projection.

The switchable diffuser 136 may be actuated in any manner and by any combination of elements configured to control the application of an appropriate electric field. For example, with reference to FIG. 2, controller 140 may be coupled with a circuit including a voltage source that may apply a voltage to switchable diffuser 136. Conductive elements 142 and/or 144 may be integrated with or otherwise coupled to switchable diffuser 136 to enable an electric field to be applied across switchable diffuser 136. Controller 140 may selectively regulate the application of voltage from a voltage source to switchable diffuser 136 through the circuitry connected thereto. In some embodiments, controller 140 may actuate a switch that connects and/or disconnects a voltage source with one or more of conductive elements 142 and/or 144.

Figure 3A:
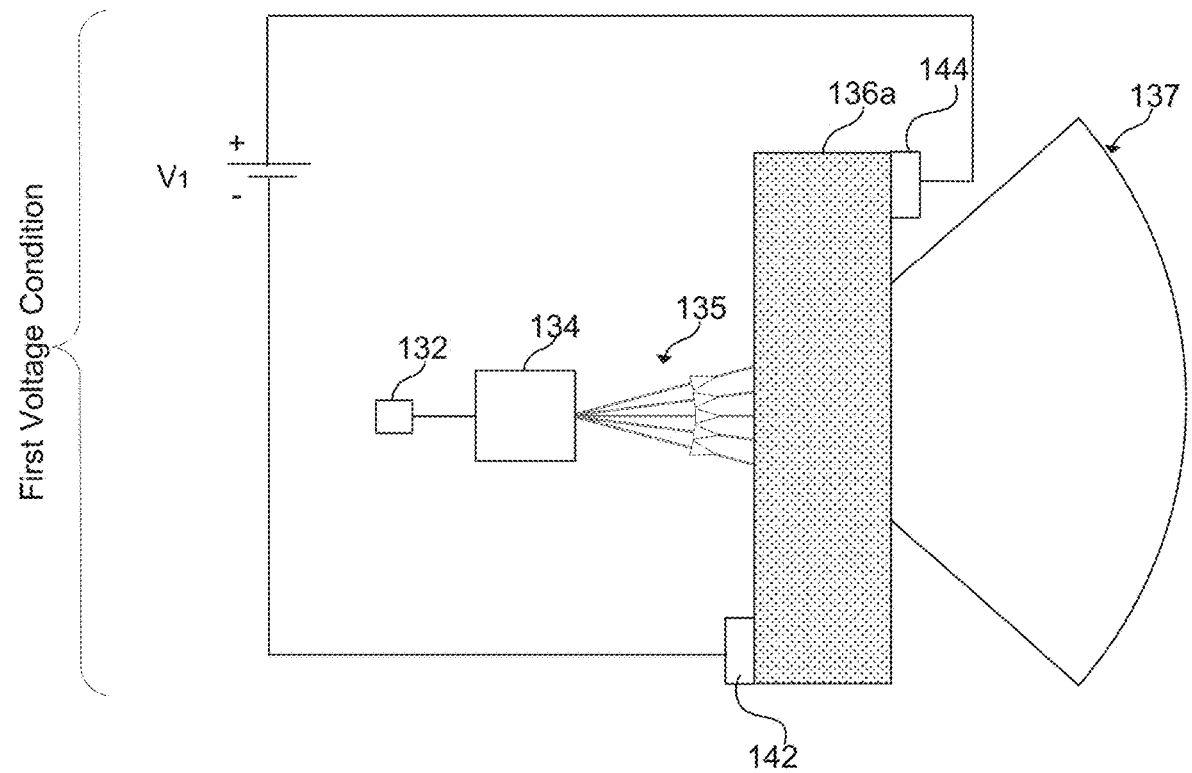
FIG. 3A illustrates a change in the operation of an example switchable diffuser, in a first position within an example system arrangement, upon a change in an applied electric field across the switchable diffuser caused by a switch from a first voltage condition to a second voltage condition, in accordance with one or more embodiments of the present disclosure.
Figure 3A:
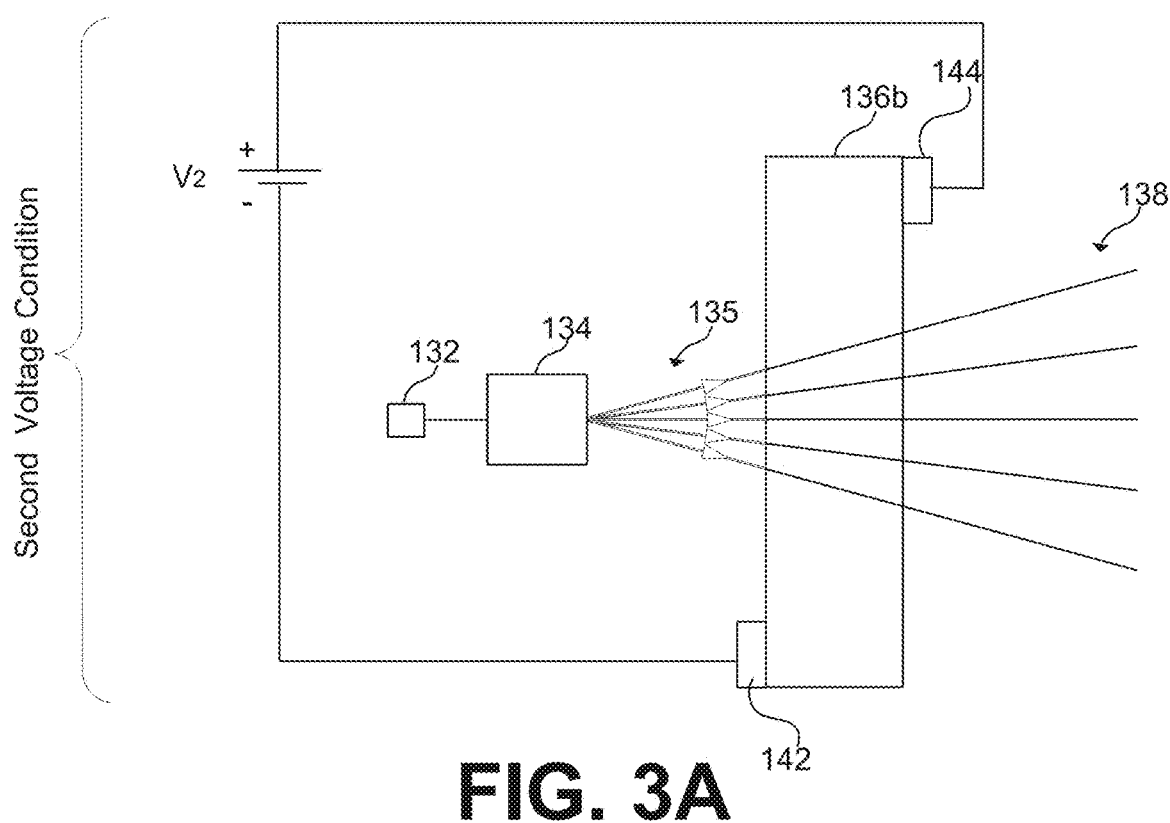

FIG. 3A illustrates a change in the operation of an example switchable diffuser 136 upon a change in an applied electric field across the switchable diffuser caused by a switch from a first voltage condition to a second voltage condition, where the change between the first voltage condition and second voltage condition (and consequently the "off" state and the "on" state of the switchable diffuser 136) are controlled by controller 140 (not shown).

As shown, when a voltage source is controlled to deliver a first voltage (denoted by variable $V_1$ in the upper image of FIG. 3A) to a switchable diffuser 136 (identified as 136a in the upper image), the switchable diffuser may remain in its natural condition and act as a diffuser/scatterer of incoming light. This may be referred to as the "off" state. In some embodiments, the first voltage, $V_1$, may be 0 V, wherein the "off" state actually corresponds to the voltage being turned "off" from the perspective of the switchable diffuser 136. It should be appreciated however, that the "off" state does not necessarily have to correspond to the voltage of a voltage source being turned off.

In some embodiments the "off" state of the switchable diffuser 136 may be achieved where the first voltage is about between 0 V and 1 V. In other embodiments, the "off" state of the switchable diffuser 136 may be achieved where the first voltage is any voltage that allows or causes the liquid crystals within the polymeric structure of switchable diffuser to maintain or achieve a molecular arrangement or orientation that causes in-coupled light to become substantially scattered as it passes therethrough—thereby providing a flood light projection.

As shown, under the first voltage condition, light source 132 may provide light that is in-coupled to light projecting structure 134. The light projected from light projecting structure 134 may comprise a plurality of dot projections forming a dot array (i.e., a plurality of narrow beams of light projected in a structured or random pattern). The dot projections are generally identified by numeral 135 in FIG. 3A.

The dot projections 135 may be incident upon a first surface of switchable diffuser 136, or otherwise coupled into switchable diffuser 136. Under the first voltage condition, the dot projections 135 that are in coupled to switchable diffuser 136 are scattered by the molecular structure of the switchable diffuser 136. Consequently, switchable diffuser 136 transforms the incoming structured light 135 received at a first surface into flood light projected out of a second surface. The flood light projection out of the second surface of switchable diffuser 136a is generally identified by numeral 137 in FIG. 3A.

Before discussing the lower image of FIG. 3A, it should be noted that switchable diffuser 136 is identified by numeral 136a in the upper image to designate the "off" state (or, in other words, a diffuser/scatterer condition), and is identified by numeral 136b in the lower image to designate the "on" state (or, in other words, a transparent or substantially transparent condition). That is, switchable diffuser 136a (shaded) and 136b (not shaded) in FIG. 3A, are the same switchable diffuser, just in different operating states based on the different electric field or voltage being applied (or not being applied, as the case may be), as between the first voltage condition and the second voltage condition.

As shown in the lower portion of FIG. 3A, when a voltage source is controlled to deliver a second voltage (denoted by variable $V_2$ in the lower image of FIG. 3A) to a switchable diffuser 136 (identified as 136b in the lower image), the molecular orientation of the switchable diffuser material may change such that the switchable diffuser is transparent or substantially transparent to the incoming light. This may be referred to as the "on" state. In some embodiments, the second voltage, $V_2$, may be about between 1 V and 50 V, wherein the "on" state actually corresponds to the voltage being turned "on" from the perspective of the switchable diffuser 136. It should be appreciated however, that the "on" state does not necessarily have to correspond to the voltage of a voltage source being turned on.

As noted above, it should be understood that the aforementioned "off" state does not necessarily have to correspond to the voltage of a voltage source being turned off, and that the "on" state does not necessarily have to correspond to the voltage of a voltage source being turned on. In some embodiments, the "on" state and the "off" state may be said to assume the opposite states as those discussed above. That is, the first voltage condition may achieve an "on" state such that the dot projections that are in coupled to switchable diffuser are allowed to pass through substantially unscattered by the molecular structure of the switchable diffuser, and the second voltage condition may achieve the "off" state such that the dot projections that are in coupled to switchable diffuser are scattered/diffused by the molecular structure of the switchable diffuser and out coupled from the switchable diffuser as flood light. Consequently, switchable diffuser under the first voltage condition (achieving the "on" state) may result in a dot array projection therefrom, while switchable diffuser under the second voltage condition (achieving the "off" state) may result in a flood projection therefrom.

In some embodiments, the switchable diffuser is substantially transparent to the in coupled dot projections in its natural state or under a first voltage condition (e.g., where the applied voltage is about between 0 V and 1 V) and substantially scattering/diffusive to the in coupled dot projections in its unnatural state or under a second voltage condition (e.g., where the applied voltage is about between 1 V and 50 V). Either such scenario may be referred to as the "on" state or the "off" state, depending on convention desired.

In some embodiments the "on" state of the switchable diffuser 136 may be achieved where the second voltage is 0 V. In other embodiments, the "on" state of the switchable diffuser 136 may be achieved where the first voltage is any voltage that allows or causes the liquid crystals within the polymeric structure of switchable diffuser to maintain or achieve a molecular arrangement or orientation that causes the switchable diffuser to be transparent or substantially transparent to incoming light, thus allowing the in-coupled light from light projecting structure 134 and/or light source 132 to pass therethrough without substantial dispersion, diffusion, or other divergence that substantially disrupts the narrow beam dot projection character of the light—thereby providing a structured or random pattern of dot beams to be projected onto a surface of an object and reflected back to a detector 120 (shown in FIGS. 1-2).

As shown in the lower image of FIG. 3A, under the second voltage condition, light source 132 may continue to provide light that is in-coupled to light projecting structure 134. As above, the light projected from light projecting structure 134 continues to comprise a plurality of dot projections (i.e., a plurality of narrow beams of light projected in a structured or random pattern). The dot projections 135 may be incident upon a first surface of switchable diffuser 136, or otherwise coupled into switchable diffuser 136. Under the second voltage condition, the dot projections 135 that are in coupled to switchable diffuser 136 are not substantially scattered by the molecular structure of the switchable diffuser 136. Consequently, switchable diffuser 136 allows the dot light beams 135 received at a first surface to pass through and out of a second surface, continuing onward as narrow beam dot projections. The dot projections proceeding out of the second surface of switchable diffuser 136*b* are generally identified by numeral 138 in FIG. 3A.

Figure 3B:
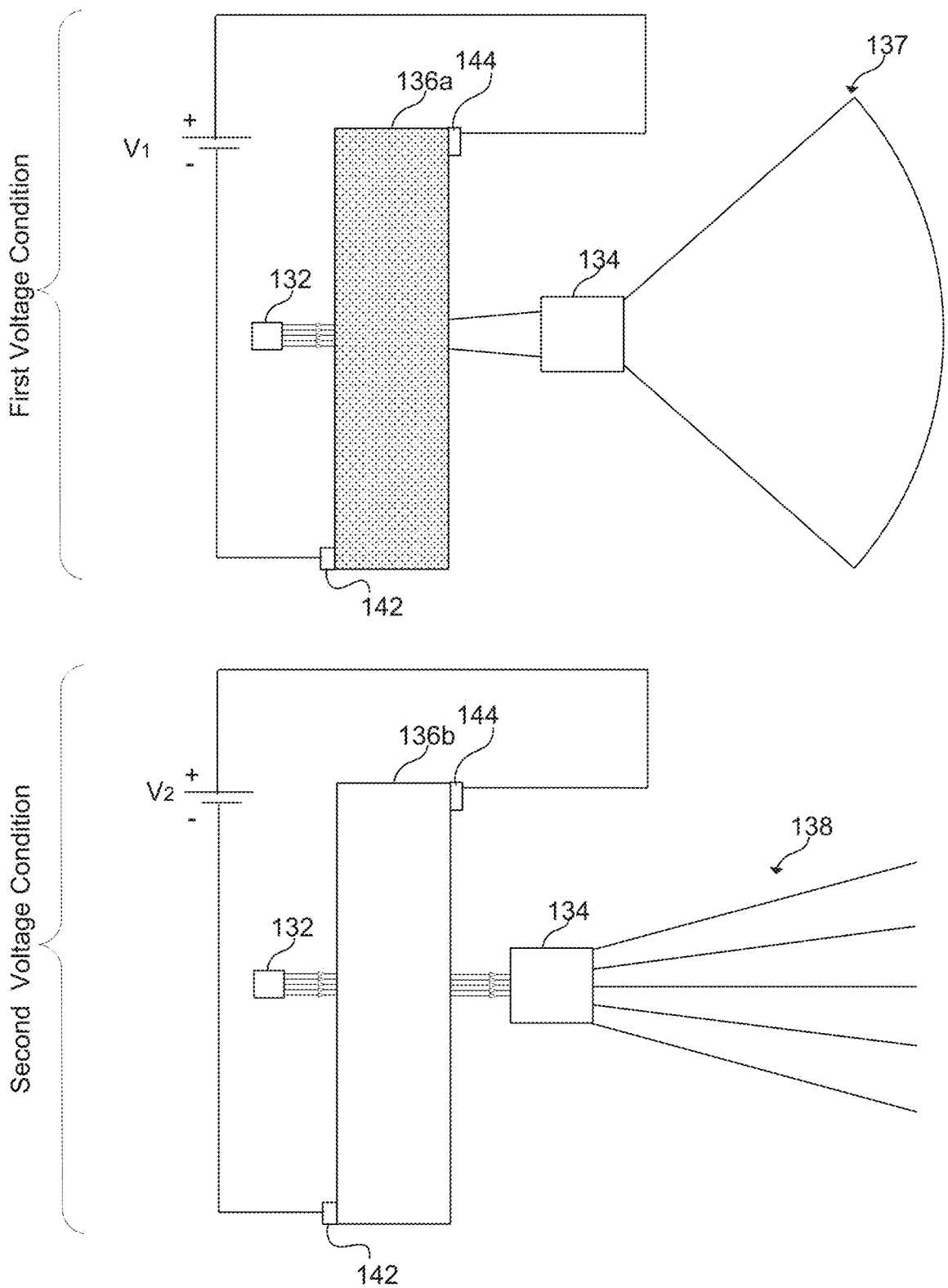
FIG. 3B illustrates a change in the operation of an example switchable diffuser, in a second position within an example system arrangement, upon a change in an applied electric field across the switchable diffuser caused by a switch from a first voltage condition to a second voltage condition, in accordance with one or more embodiments of the present disclosure.

Although FIG. 3A illustrates (by way of example only) that the switchable diffuser 136 is positioned after the light projecting structure 134 (e.g., projection lens), the switchable diffuser 136 may also be arranged in other positions with respect to the elements of light projecting subsystem 130. For example, in some embodiments a switchable diffuser may be positioned between the light source 132 and the projection lens 134, as shown in FIG. 3B (with common numerals representing common elements discussed above with reference to FIG. 3A). In another example the light projection structure 134 and/or the light source 132 is made up of several elements, and the switchable diffuser can be positioned before, between or after any of them in the arrangement. For instance, where the light projecting subsystem 130 includes a light engine (e.g., VCSEL) and a waveguide or diffraction element (e.g., DOE), the switchable diffuser may be positioned before, between, or after any such elements.

Figure 3C:
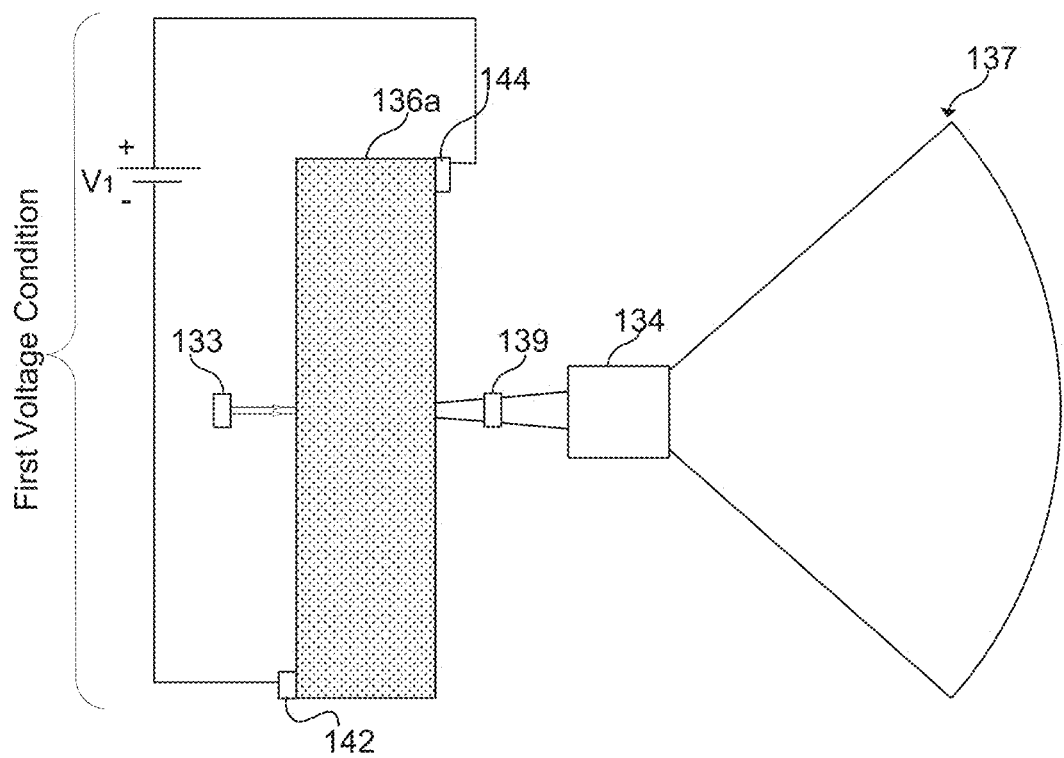
FIG. 3C illustrates a change in the operation of an example switchable diffuser, in a third position within an example system arrangement, upon a change in an applied electric field across the switchable diffuser caused by a switch from a first voltage condition to a second voltage condition, in accordance with one or more embodiments of the present disclosure.
Figure 3C:
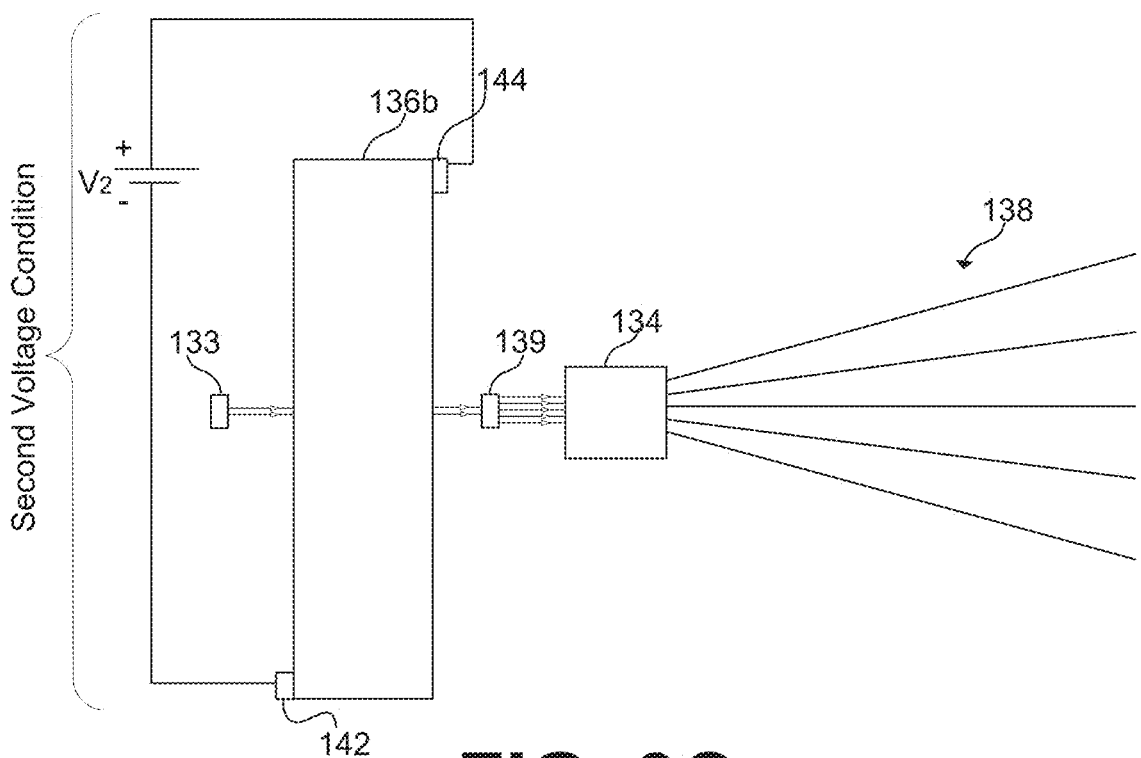

For example, as shown in FIG. 3C, the light projecting subsystem 130 may comprise a diffraction optical element ("DOE") 139 to generate multiple dots in combination with a VCSEL array 133, and the switchable diffuser 136 may be positioned between them. Other examples are possible, and a person of skill in the art will appreciate from the present disclosure that any ordered arrangement including a switchable diffuser may be deployed in implementations of the presently disclosed systems. In other examples, for instance, the light source 132 in FIG. 3A or FIG. 3B may comprise the VCSEL array 133*a* and DOE 133*b* of FIG. 3C, and a switchable diffuser may be positioned before, between, or after any such elements. It will be understood that the configurations shown are merely examples provided for clarity of description, and that other arrangements and variations may be implemented without exceeding the scope of the present disclosure.

Referring back now to FIGS. 1-2, controller 140 may cause operation of the aforementioned elements to be synchronized based on one or more device operating capabilities or requirements, environmental conditions, default or user defined settings, or any other input. For example, if light sensor 122 is controlled to capture image information for a given frame for a period of 1/60 seconds, the controller 140 may control switchable diffuser 136 to switch between an "off" state and an "on" state within the period of time that the image information is captured for a given frame. That is, for a given frame capture, controller 140 may effectuate a switch of the switchable diffuser 136 such that both dot projection reflections and flood projection reflections are received (in time-multiplexed manner, as noted above) by the detector 122 during the period of light capture for the frame.

In some embodiments, controller 140 may be configured to oscillate (or otherwise change) the electric field applied to the switchable diffuser to impose state transitions of the switchable diffuser at a rate that is between 2-100 times faster than the frame rate established for image capture. For example, if the frame rate in a given scenario is 20 frames per second, the controller 140 may be configured to change the electric field applied to the switchable diffuser to cause the switchable diffuser to change back and forth between a substantially transparent state and a substantially scattering state 100 times/second (e.g., 5 times faster than the frame rate). In some embodiments, controller 140 may be configured to oscillate the electric field applied to the switchable diffuser at a rate that is between greater than 100 times faster than the frame rate established for image capture.

Figure 4:
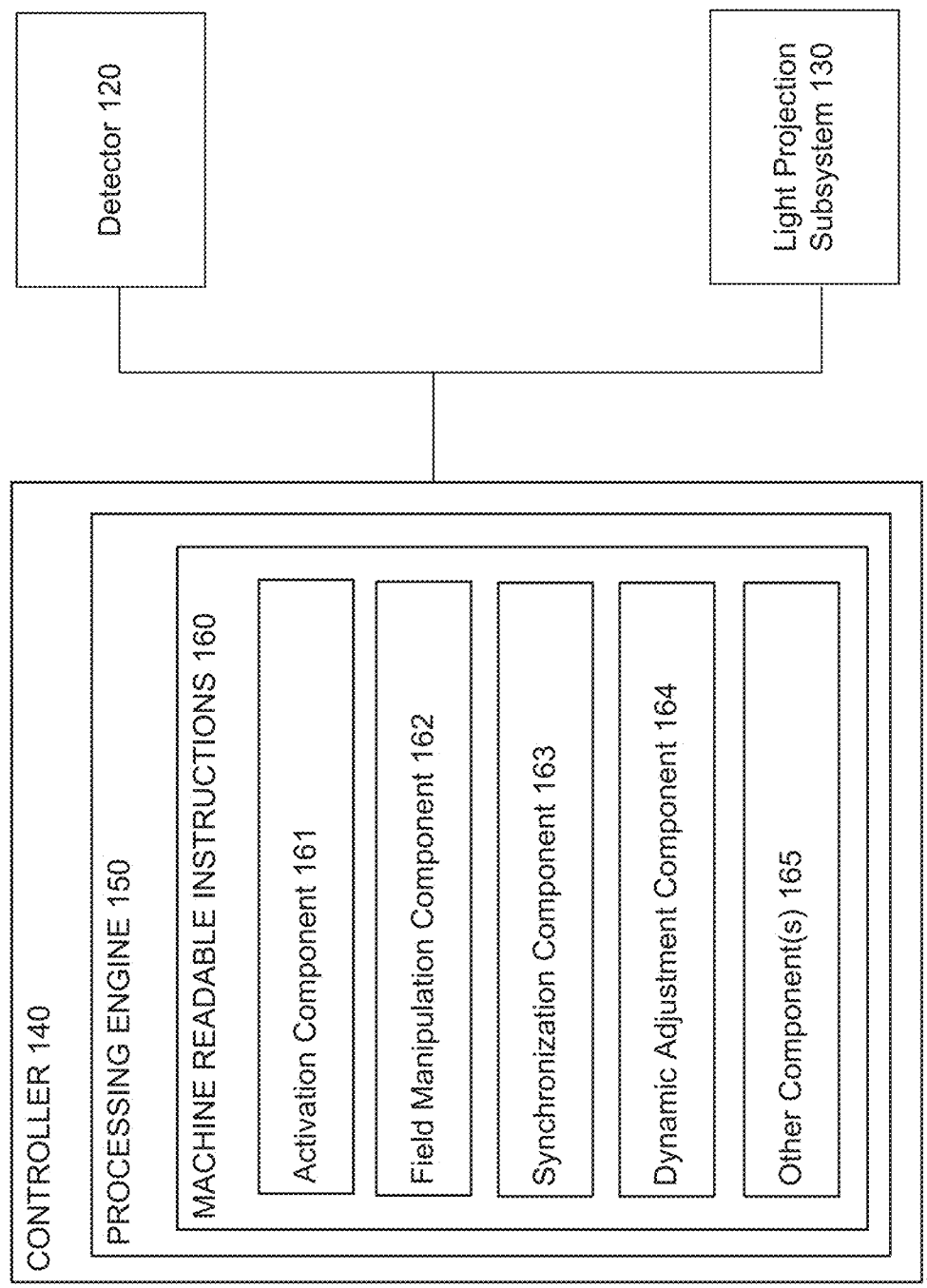
FIG. 4 illustrates an example architecture depicting various subcomponents of a controller that may be implemented in accordance with various embodiments of the present disclosure.

FIG. 4 illustrates an example architecture depicting various subcomponents of controller 140 that may, upon execution, enable one or more of the features disclosed herein in connection with one or more other elements of system 100, including any one or more elements of light projection subsystem 130 and detector 120. As shown, controller 140 may be configured (or operatively coupled) with one or more processing engines 150, and one or more machine readable instructions 160 which, when executed by the one or more processing engines 150, cause one or more of the disclosed features to be effectuated. Machine readable instructions 160 may be stored on a machine readable medium. The machine readable instructions 160 may have machine readable code comprising an activation component 161, a field manipulation component 162, synchronization component 163, dynamic adjustment component 164, and/or one or more other components 165.

Activation component 161 may be configured to detect when use of imaging system 100 is desired, and to correspondingly cause the system 100 to activate one or more elements of light projection subsystem 130 and/or detector 120. For example, if a user's mobile phone is equipped with system 100, and the user's input indicates a request for 3D facial recognition (or other 3D topology mapping), activation component 161 may identify the indication provided by the user, and cause system 100 to activate the light source 132 of light projection subsystem 130 and/or detector subsystem 120. Activation component 161 may be further configured to determine an operation status of light projection subsystem 130 and/or detector subsystem 120. If the operation status of light projection subsystem 130 and/or detector subsystem 120 is satisfactory, activation component 161 may activate field manipulation component 162.

Field manipulation component 162 may be configured to cause system 100 to apply an electric field to, adjust an electric field being applied to, or remove an electric field from a switchable diffuser 136 element of light projection subsystem 130. For example, field manipulation component 162 may cause controller 140 to apply, adjust or remove a voltage to/from switchable diffuser 136 from a voltage source to which the controller 140 is operatively coupled. By applying, adjusting or removing such electric fields, field manipulation component 162 may cause switchable diffuser 136 two switch back-and-forth between an "off" state (diffusion/scattering state) and an "on" state (transparent state). Field manipulation component 162 may be configured to time its operations in accordance with the operation of other elements of system 100, for example, detector 120 and other components of controller 140. In so doing, field manipulation component 162 may draw on information determined, stored, or otherwise provided by synchronization component 163.

Synchronization component 163 may be configured to determine an operation speed or rate of image capture being performed, or capable of being performed, by detector subsystem 120 and/or controller 140 in connection with detector subsystem 120. Additionally, synchronization component 163 may determine or control the timing of operation of such elements, and informed field manipulation component 162 of the same. For example, as noted above, if light sensor 122 is controlled to capture image information at 60 frames per second (meaning that for a given frame image capture occurs for a period of 1/60 second or less), synchronization component 163 may identify this operation capacity (based on detection or based on pre-determined/stored information) and may further provide a start and/or stop time to either or both of activation component 161 and field manipulation component 162. In other words, in some embodiments synchronization component 163 may be configured with a clock that can be used in connection with the operations of activation component 161 and field manipulation component 162 (or any other components of system 100), to synchronize functionality such that the desired performance may be achieved. The desired performance in a given situation may be pre-determined, or it may be dynamically adjustable given one or more detectable conditions. The dynamically adjustable features of the presently disclosed technology may be enabled, in whole or in part, by a dynamic adjustment component 164.

Dynamic adjustment component 164 may be configured to detect one or more internal or external conditions or requests that call for an adjustment to any default or otherwise predetermined operation settings of system 100. Dynamic adjustment component 164 may be informed by one or more sensors or detection engines operating in connection with one or more other components 165. For example, a default setting of system 100 may provide that field manipulation component 162 will operate to switch the switchable diffuser 136 between it "on" and "off" state such that, during image capture for an individual frame, the ratio of time for flood light 137 projection to time for dot projection 138 is 1:3. That is, during ¼ of the image capture time for a given frame, flood light 137 is to be projected out of the second surface of switchable diffuser 136, and during ¾ of the image capture time for a given frame, dot projections 138 are to be projected out of the second surface of switchable diffuser 136. However, if dynamic adjustment component 164 detects that ambient light conditions in the external environment of system 100 provide poor illumination, dynamic adjustment component 164 may determine that the ratio of time for floodlight 137 projection to time for dot projection 138 should be modified from 1:3 to 1:1 to provide additional flood light 137 illumination on an object within that environment (e.g., a user's face).

In the example above, dynamic adjustment component 164 may operate to cause field manipulation component 162 to impose a voltage oscillation pattern on switchable diffuser 136 such that switchable diffuser 136 assumes and "on" state during approximately ½ of the image capture time for an individual frame, and assumes an "off" state during the other ½ of the image capture time for such frame. Consequently, during ½ of the image capture time for a given frame, flood light 137 will be projected out of the second surface of switchable diffuser 136, and during the other ½ of the image capture time for a given frame, dot projections 138 will be projected out of the second surface of switchable diffuser 136. Thereby, field manipulation component 162 may operate responsively to one or more of dynamic adjustment component 164 and/or synchronization component 163, and/or activation component 161, and/or any other components 165 of system 100.

In addition to external conditions, such as ambient light conditions, dynamic adjustment component 164 may be configured to detect when a given situation calls for higher than default resolution and/or timing for facial recognition. For example, if a user of a mobile phone equipped with system 100 is simply trying to unlock their device using facial recognition, the default resolution may simply correspond to a ratio of time for flood light 137 projection to time for dot projection 138 of 1:3 (for each frame) and require that the image information be collected for 0.5 seconds at 60 frames per second. However, if a user is attempting to use the facial recognition capabilities of system 102 login to a high-security or heavily restricted database, or alternatively if the user is attempting to use facial recognition to authorize a purchase of an item for over $1000 USD, dynamic adjustment component 164 may determine that under such conditions a higher resolution facial rendering is required to achieve an adequate matching condition (e.g., with a stored template of the user's facial topology) to authorize the login or the purchase. Under such conditions, dynamic adjustment component 164 may be configured to cause field manipulation component 162 and or synchronization component 163 to make necessary adjustments so as to enable system 100 to generate or obtain higher resolution 3D information that satisfies the higher security requirements associated with the detected login request or purchase request. For example, dynamic adjustment component 164 may require field manipulation component 162 to provide more or less floodlight as compared to dot projections for a first period of image capture, and then to cause an adjustment to such floodlight and dot projection proportions for a second period of image capture. Additionally or alternatively, dynamic adjustment component 164 may require that field manipulation component operate for a longer period of time than otherwise set by default. Similarly, dynamic adjustment component 164 may cause activation component 161 and synchronization component 163 to operate for a longer period of time than otherwise set by default for circumstances where higher security is demanded, and consequently high-resolution image information is required. Any and all of such settings and dynamic adjustments may be preset or predefined by a user, or may be learned over time with repetitive use and training of system 100 in various circumstances.

As noted previously, the controller 140 may control switchable diffuser 136 to switch between an "off" state and an "on" state within the period of time that the image information is captured for a given frame. It is also noted here that controller 140 (e.g., via field manipulation component 162) may cause switchable diffuser 136 to switch between an off state and an on state multiple times during image capture for a given frame. That is, for a given frame capture, controller 140 may effectuate a switch of the switchable diffuser 136 such that both dot projection reflections and flood projection reflections are received (in time-division multiplexed manner, as noted above) by the detector 122 during the period of light capture for the frame. In some embodiments, controller 140 may be configured to oscillate (or otherwise change) the electric field applied to the switchable diffuser at a rate that is between 2-100 times faster than the frame rate established for image capture. In some embodiments, controller 140 may be configured to oscillate the electric field applied to the switchable diffuser at a rate that is between greater than 100 times faster than the frame rate established for image capture.

Synchronization component 163 may operate to inform other elements of system 100 as to the timing of light projections, thereby informing the processing of light information received by the light sensor 122 of detector subsystem 120 such that system 100 may discriminate or otherwise distinguish between light information that is associated with reflected floodlight, and light information that is associated with reflected dot projections, and adjust other operations accordingly. In other words, synchronization component 163 may provide multiplexing functionality in connection with received image information. Thus, for example, synchronization component 163 may enable detector 120 to capture IR image photos (e.g., heat signature photos) during time periods of flood light projection, and IR dot array photos during IR dot projections.

As will be appreciated by those of skill in the art, although shown in FIG. 4 as being embodied as machine-readable instructions 160, any one or more of activation component 161, field manipulation component 162, synchronization component 163, dynamic adjustment component 164, and/or other components 165 may be implemented in either hardware or software or both.

Figure 5:
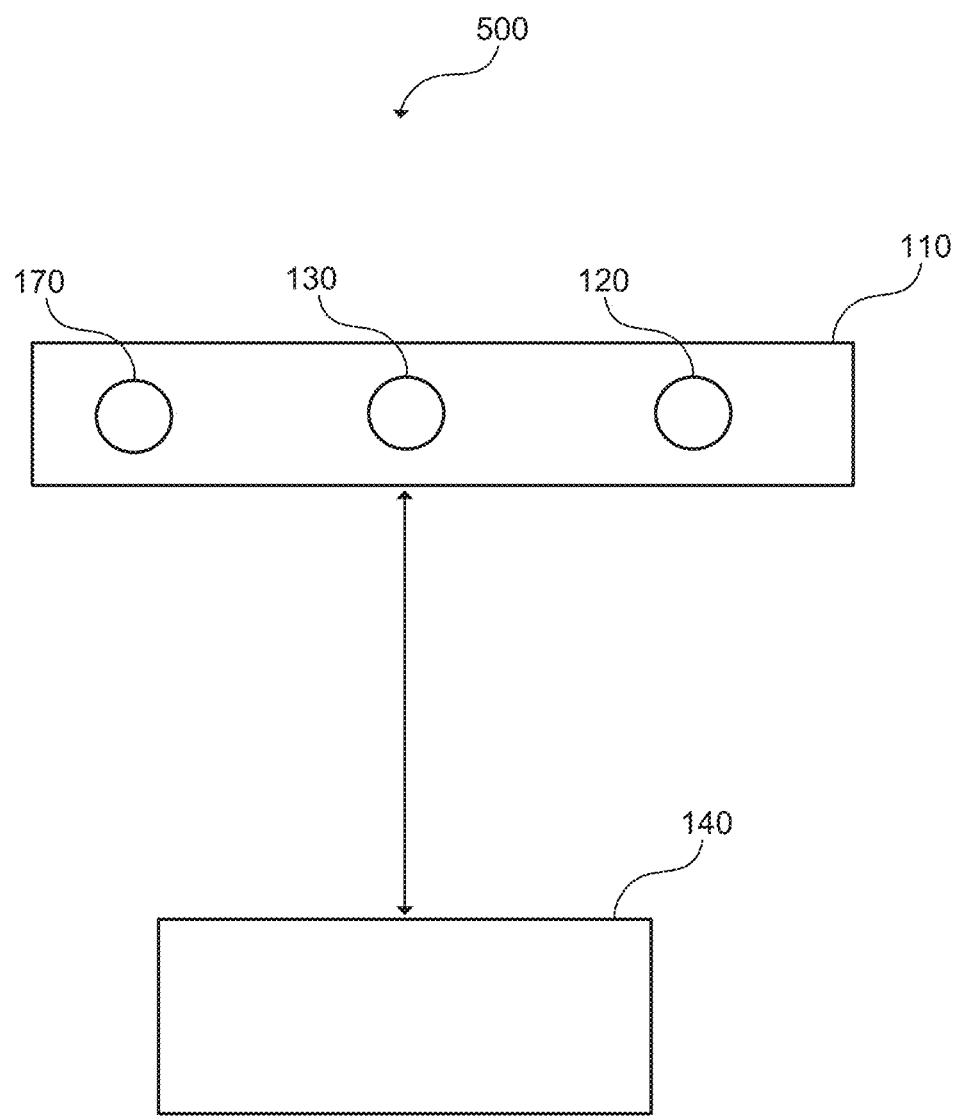
FIG. 5 is a graphical illustration of another example system in accordance with various embodiments of the present disclosure, including a module combining a Time of Flight (ToF) detector with an IR detector and a switchable diffuser.

FIG. 5 illustrates a system 500 that may be implemented in accordance with one or more embodiments of the present disclosure. System 500 is depicted as a variation of system 100, where module 110 is equipped with both a non-ToF light detector (e.g., detector 120, discussed above), as well as a Time of Flight detector, ToF detector 170. Detector 120 may capture/transduce/filter reflections of light (structured light and/or flood light) off of the surface(s) an object(s) upon which the light is projected (e.g., a face). Light information captured by detector 120 may be used to determine depth information (in the case of reflected columnated light, based on shifts and distortions relative to a reference) and object feature information (in the case of reflected flood light, based on wavelength/frequency). The ToF detector 170, on the other hand, operates based on the pulsed time-of-flight principle (rather than being primarily based on shifts, distortion, frequency, or wavelength).

The pulsed time-of-flight principle recognizes that the time light needs to travel from a light source to an object and back to a detector changes depending on how far away the object is from the light source and/or ToF detector—i.e., the further the distance the light has to travel through space, the longer amount of time it will take for the light to reach the ToF detector. For ToF detection to operate properly, both the light source and the ToF detector must be synchronized such that distances can be extracted and calculated from the time differences detected. In particular, the timing details of the light pulse generated by the light source and the timing details of the light received back at the ToF detector should be tightly controlled and/or monitored. The resolution of ToF based images enhances with enhanced monitoring and/or control of timing.

In the embodiment shown in FIG. 5, module 110 is provided with both a non-ToF detector 120 as well as a ToF detector 170. Both are configured to receive light reflections from the light projected from light projection system 130, but each assesses the light differently (or produce signals that may be assessed differently) to derive depth information and/or other structural features about objects upon which the light projected from light projecting system 130 is incident.

In some embodiments, light projecting subsystem 130 of system 500 may include a single light source and a switchable diffuser 136. Such light source and switchable diffuser 136 may operate in accordance with one or more features of such elements as discussed herein with reference to FIGS. 1-4. Moreover, with reference to FIG. 5, in some embodiments controller 140 may be configured to operate only one of detector 120 and ToF detector 170 during a given image capture period—e.g., in "ToF mode" or "non-ToF mode" (ToF mode referring to the situation where only ToF detector 170 is operating during a given image capture period, and "non-ToF mode" referring to the situation where only detector 120 is operating during a given image capture period (e.g. in accordance with FIGS. 1-4). [99] In other embodiments, controller 140 may be configured to operate both detector 120 and ToF detector 170 together during a given image capture period—e.g., in "hybrid mode" (hybrid mode referring to the case where controller 140 synchronizes operations of detector 120, ToF detector 170 (along with other elements of system 500, e.g., light projecting subsystem 130) such that both detectors are in operation during a given image capture period.

In some embodiments, controller 140 may effectuate operation of system 500 in ToF mode, non-ToF mode, or hybrid mode based on input from a user (e.g., user selection). In some embodiments, controller 140 may be configured to effectuate a switch between modes depending on one or more detected condition(s), e.g., lighting conditions, component status detection, etc. For instance, if dynamic adjustment component 164 of controller 140 detects that ambient light conditions in the external environment of system 100 provide poor illumination (e.g., an illumination that falls beneath a predefined threshold (e.g. a luminance threshold)), or another element of system 500 (including any element of system 100) detects that the object being imaged is too far away for structured light detection to be effective (e.g., an object is beyond a predefined distance (e.g., beyond 2 meters), dynamic adjustment component 164 may determine that ToF imaging will generate a higher resolution image than the image generated via detector 120. In response to such a determination, controller 140 may effectuate operation of the system such that module 110 operates in ToF mode.

In another example, if an element of system 500 (including any element of system 100) detects that the object being imaged is within a predetermined distance from the detector within which the structured light detection via detector 120 will generate an image with a higher resolution that is superior to that provided by ToF detection (e.g., an object is within a predefined distance (e.g., within 1 meter), then dynamic adjustment component 164 may determine that detector 120 will generate a higher resolution image than the image generated via ToF detector 170. In response to such a determination, controller 140 may effectuate operation of the system such that module 110 operates in non-ToF mode.

In still another example, if an element of system 500 (including any element of system 100) detects some condition(s) that make ToF detection via detector 170 desired (or undesired as the case may be) and/or some condition(s) that make structured light detection via detector 120 desired (or undesired as the case may be), then dynamic adjustment component 164 may determine that the best image information may be obtained by operating detector 120 and ToF detector 170 in concert (e.g., simultaneously, or in a time-multiplexed manner) during a given image capture period. In response to such a determination, controller 140 may effectuate operation of the system such that module 110 operates in hybrid mode. Such a determination may be made based on predetermined rules/criteria with regard to such detected conditions, as may be set for a given application.

In hybrid mode operation, controller 140 may regulate and/or monitor the timing of switchable diffuser's switch between states (and thereby monitor the switching between flood light projections and structured array light projections), and treat one or the other as the "pulse" to track for purposes of computing time-of-flight differences in connection with light received at the ToF detector 170. That is, controller 140—via synchronization component 163 or another component—may synchronize operation of detector 120 and ToF detector 170 with the timing of the different light projections (e.g., structured dot array projections, flood light projections, etc.) propagating from light projection subsystem 130. In this way, the time-multiplexed light information obtained via detector 120 and ToF detector 170 may be coherently de-multiplexed and/or otherwise resolved by system 500. In some embodiments, the imaging information obtained via detector 120 and ToF detector 170 during hybrid mode operation may be combined to generate a composite image.

In still further embodiments, hybrid mode operations may tuned to optimize resolution (or enhance resolution) based on the one or more conditions detected. For example, if dynamic adjustment component 164 of controller 140 detects that ambient light conditions in the external environment of system 500 provide an illumination quality that make hybrid mode desired, but illumination should be enhanced by flood light in a proportion greater than a 1:1 (flood light projection to structured array projection ratio), dynamic adjustment component 164 may determine not only that hybrid mode should be activated/selected, but further that the ratio of time for floodlight projections to time for structured dot projections should be modified from 1:1 to 2:1 to provide additional flood light illumination on an object within that environment (e.g., a user's face).

Alone or in conjunction with dynamic adjustment component 164, synchronization component 163 may be configured to make corresponding adjustments to aid controller 140 in resolving the light information as transduced by detector 120 and ToF detector 170 during hybrid mode. For example, synchronization component 163 may determine an operation speed or rate of image capture set to be performed by detector subsystem 120, ToF detector 170 and/or controller 140, and may facilitate control of the timing of operation or initialization of such elements. Synchronization component 163 and/or dynamic adjustment component 164 may inform field manipulation component 162 of the same. For example, as noted above, if light sensor 122 is controlled to capture image information at 60 frames per second (meaning that for a given frame image capture occurs for a period of 1/60 second or less), synchronization component 163 may identify this operation capacity (based on detection or based on pre-determined/stored information) and may further provide a start and/or stop time to either or both of activation component 161 and field manipulation component 162. In other words, in some embodiments synchronization component 163 may be configured with a clock that can be used in connection with the operations of activation component 161, field manipulation component 162, dynamic adjustment component 163 (or any other components of system 500), to synchronize functionality such that the desired performance may be achieved in a given scenario. The desired performance in a given situation may be pre-determined, or it may be dynamically adjustable, in whole or in part, by a dynamic adjustment component 164 based on one or more detectable conditions.

Synchronization component 163 may, in hybrid mode, operate to inform other elements of system 500 as to the timing of light projections, thereby informing the processing of light information received by detector subsystem 120 and ToF detector 170 such that system 500 may not only discriminate or otherwise distinguish between light information that is associated with reflected floodlight, and light information that is associated with reflected dot projections, but also may distinguish light information associated with ToF derivations from light information associated with non-ToF derivations, and adjust other operations accordingly. In other words, synchronization component 163 may provide multiplexing functionality in connection with received image information. Thus, for example, synchronization component 163 may enable detector 120 to capture IR image photos (e.g., heat signature photos) during time periods of flood light projection, and IR dot array photos during IR dot projections, and in the same image capture period enable ToF detector 170 to capture temporally resolved image photos during time periods of IR dot projections (e.g., or other structured array projections), leveraging the structured light bursts as the "pulses" of light in accordance with the pulsed time-of-flight principal.

Said differently, synchronization component 163 may be configured to synchronize or otherwise coordinate the ToF detector 170's image capture with detector 120's (e.g., IR detector) image capture, and further synchronize both with the switchable diffuser 136's switches between "off" and "on" states. In some such embodiments, switchable diffuser 136 may be controlled to output short pulsed of flood light (e.g., 1-100 ns) or long pulsed dot light (e.g., 100 μs-30 ms) based on a switch in the applied voltage. The ToF detector 170 may be controlled by controller 140 to be pulsed to provide pulsed amplitude modulation, pulsed frequency modulation, and/or continuous wave AM/FM. In some embodiments, the ToF detector 170 and the structured light detector 120 (e.g., IR detector) may be controlled by controller 140 such that they are synchronized to match or otherwise operate in alignment with the time-division multiplexed light (flood light and structured light being time multiplexed together) signals generated by the switchable diffuser.

Persons of ordinary skill in the art will appreciate that all of the elements of controller 140 as discussed with reference to FIGS. 1-4 may be extended to embodiments employing ToF detector 170, including as discussed above with respect to synchronization component 163 and dynamic adjustment component 164. As such, system embodiments in accordance with system 500, or variations thereof, may enable the capture of 3D ToF photos/image information in synchronization with 2D IR dot photos/image information.

In embodiments utilizing ToF detectors in combination with the switchable diffuser and other light detectors, the systems of the present disclosure may provide enhance security features to ensure, for example, that the object being imaged is the true 3D object and not a 2D rendition of the object used to spoof the system. In some embodiments, the ToF detector may be controlled by controller 140 to be continuously or periodically calibrated.

Figure 6:
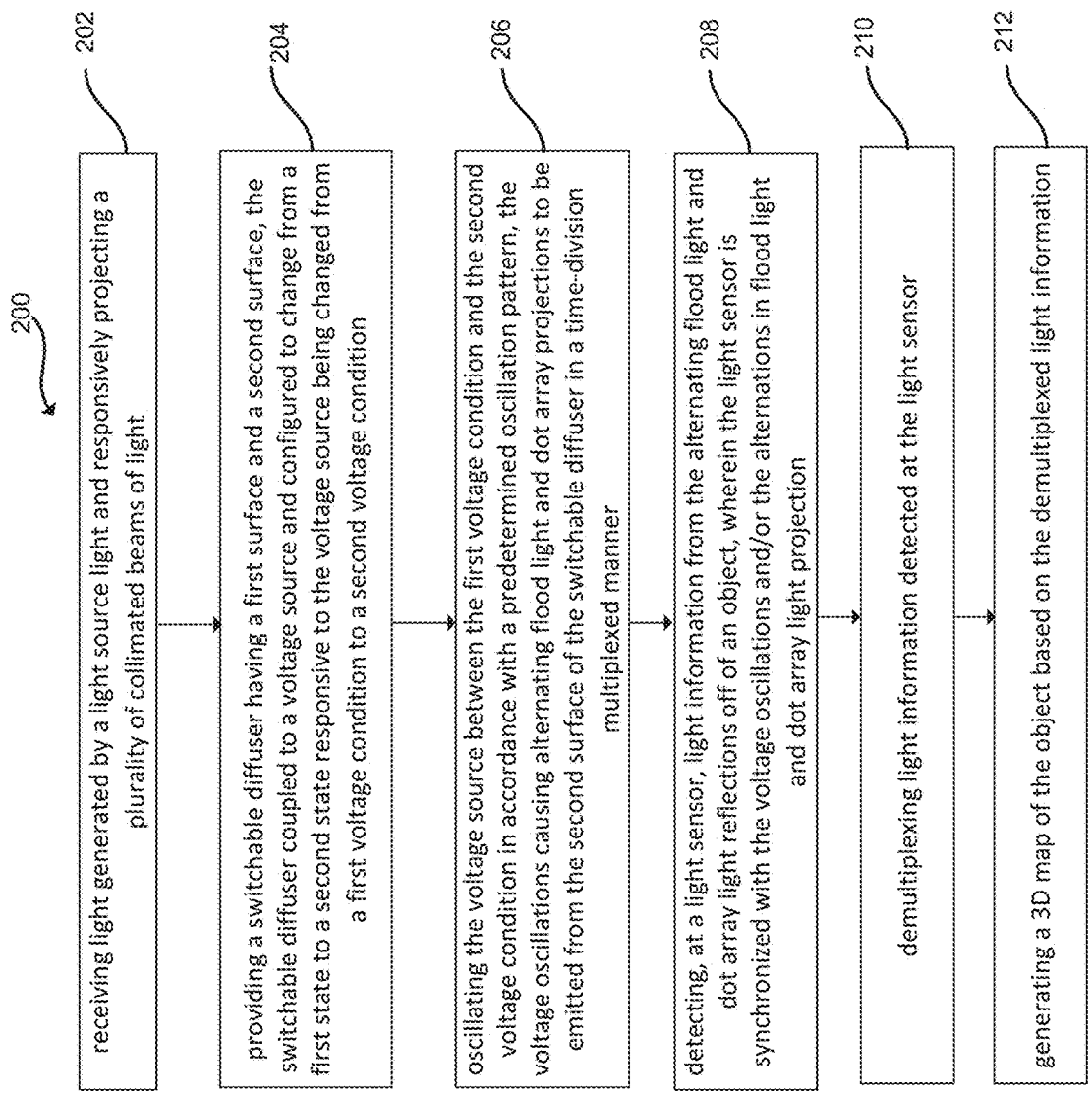
FIG. 6 is a process flow chart illustrating an example method that may be implemented in accordance with one or more embodiments of the present disclosure.

FIG. 6 illustrates a process flow diagram depicting a method that may be implemented in accordance with one or more embodiments of the present disclosure. As shown, at operation 202 method 200 comprises receiving light generated by a light source light and responsively projecting a plurality of collimated beams of light. At operation 204 method 200 comprises: providing a switchable diffuser having a first surface and a second surface, the switchable diffuser coupled to a voltage source and configured to change from a first state to a second state responsive to the voltage source being changed from a first voltage condition to a second voltage condition. At operation 206 method 200 comprises: oscillating the voltage source between the first voltage condition and the second voltage condition in accordance with a predetermined oscillation pattern, the voltage oscillations causing alternating flood light and dot array projections to be emitted from the second surface of the switchable diffuser in a time-division multiplexed manner. At operation 208 method 200 comprises: detecting, at a light sensor, light information from the alternating flood light and dot array light reflections off of an object, wherein the light sensor is synchronized with the voltage oscillations and/or the alternations in flood light and dot array light projection. At operation 210 method 200 comprises: demultiplexing light information detected at the light sensor. At operation 212 method 200 comprises: generating a 3D map of the object based on the demultiplexed light information.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The exemplary blocks or states may be performed in serial, in parallel, or in some other manner. Blocks or states may be added to or removed from the disclosed exemplary embodiments. The exemplary systems and components described herein may be configured differently than described. For example, elements may be added to, removed from, or rearranged compared to the disclosed exemplary embodiments.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific exemplary embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the exemplary configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

What is claimed is:

1. A system, comprising:
   a light projecting system configured to project a plurality of collimated beams of light;
   an structured light sensor;
   a Time-of-Flight (ToF) sensor;
   a switchable diffuser comprising a meta-stable liquid crystal material, the switchable diffuser having a first surface and a second surface, wherein the switchable diffuser is coupled to a control source and configured to change from a first state to a second state responsive to the control source being changed from a first condition to a second condition;
wherein in the first state the switchable diffuser is configured to receive collimated beams of light at the first surface and project a flood light out of the second surface;
wherein in the second state the switchable diffuser is configured to receive collimated beams of light at the first surface and project collimated beams of light out of the second surface; and
a processing engine electrically coupled with a non-transitory computer readable medium having machine readable instructions stored thereon, which, when executed by the processing engine, cause the system to:
oscillate, during a first image capture period, the control source between the first condition and the second condition in accordance with a first predetermined pattern, wherein the first predetermined pattern comprises switching between the first condition and the second condition two or more times to achieve a first predetermined ratio of flood light projection to collimated light projection;
oscillate, during a second image capture period, the control source between the first condition and the second condition in accordance with a second predetermined pattern, wherein the second predetermined pattern comprises switching between the first condition and the second condition two or more times to achieve a second predetermined ratio of flood light projection to collimated light projection, and further wherein the second predetermined ratio is different than the first predetermined ratio; and
wherein the ToF sensor and the structured light sensor are configured to receive reflections of collimated light from one or more of the same pulses of collimated light during a single image capture period.

2. The system of claim 1, wherein:
the light projecting system comprises a waveguide, the waveguide comprising a surface A and a surface B;
the surface A comprises a plurality of grating structures;
the waveguide is configured to guide an in-coupled light beam to undergo total internal reflection between the surface A and the surface B; and
the grating structures are configured to disrupt the total internal reflection to cause at least a portion of the in-coupled light beam to couple out of the waveguide from the surface A, the portion of the in-coupled light beam coupled out of the waveguide forming out-coupled light beams comprising the plurality of collimated beams of light.

3. The system of claim 2, wherein:
the surface A is in an x-y plane comprising an x-direction and a y-direction perpendicular to each other;
the in-coupled light beam propagates inside the waveguide substantially along the x-direction of the x-y plane;
the out-coupled light beams propagate substantially along a z-direction normal to the x-y plane;
the grating structure is each associated with a grating depth, a duty cycle, a period, and an orientation in the x-y plane with respect to the z-direction;
the grating structures at different x-direction positions have at least one of different grating depths or different grating duty cycles;
the grating structures at different x-direction positions have different periods; and
the grating structures at different y-direction positions have different orientations.

4. The system of claim 1, wherein the light projecting system comprises a plurality of diodes.

5. The system of claim 1, wherein the first predetermined pattern causes the light projecting out of the second surface of the switchable diffuser to comprise alternating pulses of flood light and collimated beams of light achieving a time division multiplexed emission.

6. The system of claim 1, wherein the first condition is achieved upon application of a voltage of between 75-85V for a first period of time, and the second voltage condition is achieved upon application of a voltage of between 55-65V.

7. The system of claim 1, wherein the non-transitory computer readable medium is further configured with machine readable instructions stored thereon, which, when executed by the processing engine, cause the system to: adjust the time period of one or more of the first image capture period and the second image capture period based on one or more of a detected ambient lighting condition and a transaction security condition.

8. The system of claim 1, wherein the first predetermined pattern is an oscillation pattern configured to achieve a predetermined projection ratio of flood light to collimated light.

9. The system of claim 1, wherein the first predetermined pattern is an oscillation pattern configured to achieve a predetermined projection ratio of flood light to collimated light, and further wherein the projection ratio is 1:1.

10. The system of claim 1, wherein the first predetermined pattern is an oscillation pattern configured to achieve a predetermined projection ratio of flood light to collimated light, and further wherein the projection ratio is 10:1.

11. The system of claim 1, wherein the first predetermined pattern is an oscillation pattern configured to achieve a predetermined projection ratio of flood light projection time to collimated light projection time, and further wherein the projection ratio is about between 1:1 to 10:1.

12. The system of claim 1, wherein the collimated beams of light comprise infrared frequency light.

13. A light projecting system, comprising:
an IR detector configured to capture light information based on one or more flood light reflections off of an object, and array reflections off of an object;
a Time-of-Flight (ToF) detector configured to detect differences between particles based on their time of flight;
a switchable diffuser comprising a meta-stable liquid crystal material, the switchable diffuser having a first surface and a second surface, wherein the switchable diffuser is coupled to a control source and configured to change from a first state to a second state responsive to the control source being changed from a first condition to a second condition;
wherein in the first state the switchable diffuser is configured to receive at least a portion of the plurality of collimated beams of light at the first surface and project a flood light out of the second surface;
wherein in the second state the switchable diffuser is configured to permit at least a portion of the plurality of collimated beams of light to propagate out of the second surface as an array; and
a processing engine electrically coupled with a non-transitory computer readable medium having machine readable instructions stored thereon, which, when executed by the processing engine, cause the system to:

oscillate, during a first image capture period, the control source between the first condition and the second condition in accordance with a first predetermined pattern, wherein the first predetermined pattern comprises switching between the first condition and the second condition two or more times to achieve a first predetermined ratio of flood light projection to collimated light projection;

oscillate, during a second image capture period, the control source between the first condition and the second condition in accordance with a second predetermined pattern, wherein the second predetermined pattern comprises switching between the first condition and the second condition two or more times to achieve a second predetermined ratio of flood light projection to collimated light projection, and further wherein the second predetermined ratio is different than the first predetermined ratio; and cause the switchable diffuser to emit pulses of collimated beams of light to effectuate a modulation of the collimated beams of light that the ToF detector is configured to resolve.

14. The light projecting system of claim 13, wherein: the modulation is one or more of pulsed amplitude modulation, pulsed frequency modulation, continuous wave amplitude modulation, and continuous wave frequency modulation.

15. The light projecting system of claim 13, further comprising a waveguide, wherein:
the waveguide comprises a surface A and a surface B;
the surface A comprises a plurality of grating structures;
the waveguide is configured to guide an in-coupled light beam to undergo total internal reflection between the surface A and the surface B; and
the grating structures are configured to disrupt the total internal reflection to cause at least a portion of the in-coupled light beam to couple out of the waveguide from the surface A, the portion of the in-coupled light beam coupled out of the waveguide forming out-coupled light beams comprising the plurality of collimated beams of light.

16. The light projecting system of claim 15, wherein:
the surface A is in an x-y plane comprising an x-direction and a y-direction perpendicular to each other;
the in-coupled light beam propagates inside the waveguide substantially along the x-direction of the x-y plane;
the out-coupled light beams propagate substantially along a z-direction normal to the x-y plane;
the grating structure is each associated with a grating depth, a duty cycle, a period, and an orientation in the x-y plane with respect to the z-direction;
the grating structures at different x-direction positions have at least one of different grating depths or different grating duty cycles;
the grating structures at different x-direction positions have different periods; and
the grating structures at different y-direction positions have different orientations.

17. The light projecting system of claim 13, further comprising a plurality of diodes.

18. The light projecting system of claim 13, wherein the collimated beams of light comprise infrared frequency light.

19. A light projecting method, comprising:
receiving light generated by a light source light and responsively projecting a plurality of collimated beams of light;

providing a switchable diffuser comprising a meta-stable liquid crystal material, the switchable diffuser having a first surface and a second surface, the switchable diffuser coupled to a voltage source and configured to change from a first state to a second state responsive to the voltage source being changed from a first condition to a second condition; and oscillating the voltage source between the first condition and the second condition in accordance with a first predetermined pattern, the voltage oscillations causing alternating flood light and dot array projections to be emitted from the second surface of the switchable diffuser in a time-division multiplexed manner;

wherein:
projecting a plurality of collimated beams of light comprises projecting a plurality of collimated beams of light from a waveguide, the waveguide comprising a surface A and a surface B;
the surface A comprises a plurality of grating structures;
the waveguide is configured to guide an in-coupled light beam to undergo total internal reflection between the surface A and the surface B;
the grating structures are configured to disrupt the total internal reflection to cause at least a portion of the in-coupled light beam to couple out of the waveguide from the surface A, the portion of the in-coupled light beam coupled out of the waveguide forming out-coupled light beams comprising the plurality of collimated beams of light;
the surface A is in an x-y plane comprising an x-direction and a y-direction perpendicular to each other;
the in-coupled light beam propagates inside the waveguide substantially along the x-direction of the x-y plane;
the out-coupled light beams propagate substantially along a z-direction normal to the x-y plane;
the grating structure is each associated with a grating depth, a duty cycle, a period, and an orientation in the x-y plane with respect to the z-direction;
the grating structures at different x-direction positions have at least one of different grating depths or different grating duty cycles;
the grating structures at different x-direction positions have different periods; and
the grating structures at different y-direction positions have different orientations.

20. The method of claim 19, further comprising:
detecting, at a light sensor, light information from the alternating flood light and dot array light reflections off of an object, wherein the light sensor is synchronized with the voltage oscillations and/or the alternations in flood light and dot array light projection;
demultiplexing light information detected at the light sensor; and
generating a 3D map of the object based on the demultiplexed light information.

21. The method of claim 19, wherein the first predetermined pattern causes the light projecting out of the second surface of the switchable diffuser to comprise alternating pulses of flood light and collimated beams of light achieving a time division multiplexed emission.

22. The method of claim 19, wherein the first condition is achieved upon application of a voltage of between 75-85V for a first period of time, and the second voltage condition is achieved upon application of a voltage of between 55-65V.

23. The method of claim 19, wherein the first predetermined pattern comprises switching between the first condition and the second condition two or more times during a first image capture period to achieve a first predetermined ratio of flood light projection to collimated light projection.

* * * * *